(12) United States Patent
Friedenberg et al.

(10) Patent No.: US 10,783,420 B2
(45) Date of Patent: Sep. 22, 2020

(54) TAG FOR WIRELESSLY ORGANIZING A PHYSICAL OBJECT

(71) Applicant: Adero, Inc., Goleta, CA (US)

(72) Inventors: Howard Friedenberg, Santa Barbara, CA (US); Adrian Yanes, Santa Barbara, CA (US); Kristen Johansen, Santa Barbara, CA (US); Jack J. Shen, Goleta, CA (US); Siddharth S. Sahu, Santa Barbara, CA (US); Nathan Kelly, Santa Barbara, CA (US)

(73) Assignee: Adero, Inc., Goleta, CA (US)

( * ) Notice: Subject to any disclaimer, the term of this patent is extended or adjusted under 35 U.S.C. 154(b) by 0 days.

(21) Appl. No.: 16/183,097

(22) Filed: Nov. 7, 2018

(65) Prior Publication Data

US 2020/0143215 A1 May 7, 2020

(51) Int. Cl.
*G06K 19/07* (2006.01)
(52) U.S. Cl.
CPC ..... *G06K 19/0723* (2013.01); *G06K 19/0704* (2013.01)
(58) Field of Classification Search
CPC .............. G06K 19/0704; G06K 19/0723
USPC ........................................................ 235/492
See application file for complete search history.

(56) References Cited

U.S. PATENT DOCUMENTS

| | | | |
|---|---|---|---|
| 5,892,441 A | 4/1999 | Woolley et al. | |
| 6,717,516 B2 | 4/2004 | Bridgelall | |
| 6,745,027 B2 | 6/2004 | Twitchell | |
| 7,009,519 B2 | 3/2006 | Leonard et al. | |
| 7,644,261 B2 | 1/2010 | Hsieh | |
| 7,646,292 B2 | 1/2010 | Johnson | |
| 8,094,012 B1 | 1/2012 | Tran et al. | |
| 8,373,562 B1 | 2/2013 | Heinze et al. | |
| 8,981,938 B2 | 3/2015 | Kazerouni | |
| 10,051,600 B1 | 8/2018 | Zhong et al. | |
| 10,373,463 B1 | 8/2019 | Herring | |
| 10,520,580 B2 | 12/2019 | Nossik et al. | |
| 2006/0109037 A1* | 5/2006 | Hsu ..................... | H03K 17/223 327/143 |
| 2006/0192653 A1 | 8/2006 | Atkinson et al. | |
| 2010/0060452 A1 | 3/2010 | Schuster et al. | |
| 2014/0173439 A1 | 6/2014 | Gutierrez et al. | |

(Continued)

OTHER PUBLICATIONS

International Search Report and Written Opinion for Application No. PCT/US2019/052774; dated Dec. 12, 2019, 8 pages.

(Continued)

*Primary Examiner* — Toan C Ly
(74) *Attorney, Agent, or Firm* — Brake Hughes Bellermann LLP

(57) ABSTRACT

A tag includes: a housing configured for coupling the tag to a physical object to organize activities regarding the physical object; and coupled to the housing: a wireless communication component; circuitry electrically coupled to the wireless communication component, the circuitry having a reset port and a switch port; a power source electrically coupled to the wireless communication component and the circuitry; a first switch between the power source and the reset port; a second switch between the reset port and ground, the second switch controlled by the switch port; and a capacitor between the reset port and the ground.

20 Claims, 9 Drawing Sheets

(56) References Cited

U.S. PATENT DOCUMENTS

| | | |
|---|---|---|
| 2014/0368334 A1 | 12/2014 | Tian et al. |
| 2015/0126234 A1 | 5/2015 | Rodriguez |
| 2015/0128733 A1* | 5/2015 | Taylor .................... H02J 50/80 |
| | | 73/865.8 |
| 2016/0231372 A1 | 8/2016 | Wootton et al. |
| 2016/0260301 A1 | 9/2016 | Miller et al. |
| 2016/0364682 A1 | 12/2016 | Jones et al. |
| 2017/0093982 A1 | 3/2017 | Shaashua et al. |
| 2018/0039934 A1 | 2/2018 | Mulaosmanovic et al. |
| 2018/0091138 A1* | 3/2018 | Greither ............... H03K 17/687 |
| 2018/0225951 A1 | 8/2018 | De Barros Chapiewski et al. |
| 2019/0096209 A1 | 3/2019 | Chen et al. |

OTHER PUBLICATIONS

International Search Report and Written Opinion for Application No. PCT/US2019/052776, dated Oct. 29, 2019, 6 pages.
International Search Report and Written Opinion for Application No. PCT/US2019/052777, dated Dec. 12, 2019, 9 pages.

\* cited by examiner

TAG FOR WIRELESSLY ORGANIZING A PHYSICAL OBJECT

CROSS-REFERENCE TO RELATED APPLICATIONS

This patent application relates to the following patent applications filed concurrently herewith ("the related patent applications"):

U.S. patent application Ser. No. 16/183,079, filed Nov. 7, 2018, associated, and entitled "Organizing physical objects using wireless tags."

U.S. patent application Ser. No. 16/183,087, filed Nov. 7, 2018, associated, and entitled "Organizing groups of physical objects using wireless tags."

U.S. patent application Ser. No. 16/183,092, filed Nov. 7, 2018, associated, and entitled "Providing indication to location of physical object using wireless tag."

Each one of the related patent applications is incorporated herein by reference in its entirety.

TECHNICAL FIELD

This document relates, generally, to organizing physical objects using wireless tags.

BACKGROUND

The universe of internet-of-things (IoT) devices continues to expand, which can lead to transformation of homes, offices, retail stores, warehouses and public spaces. Smartphones, smart thermostats and smart light bulbs have been introduced. Although connected to a network, single-purpose, siloed IoT devices may suffer from the shortcoming that they are in a sense not truly aware of each other, and the system cannot take into account the bigger picture. For example, there may be no shared context.

SUMMARY

In a first aspect, a tag includes: a housing configured for coupling the tag to a physical object to organize activities regarding the physical object; and coupled to the housing: a wireless communication component; circuitry electrically coupled to the wireless communication component, the circuitry having a reset port and a switch port; a power source electrically coupled to the wireless communication component and the circuitry; a first switch between the power source and the reset port; a second switch between the reset port and ground, the second switch controlled by the switch port; and a capacitor between the reset port and the ground.

Implementations can include any or all of the following features. The tag further comprises a button on an outside of the housing, the button coupled to the first switch. The tag further comprises a sensor coupled to the circuitry, the circuitry configured to adapt a behavior of the tag based on an output of the sensor. The output of the sensor indicates at least one of: moisture, humidity, temperature, pressure, altitude, acoustics, wind speed, strain, shear, magnetic field strength and/or orientation, electric field strength and/or orientation, electromagnetic radiation, particle radiation, compass point direction, or acceleration. The circuitry is configured to repeatedly generate a discharge signal at the switch port to discharge the capacitor and prevent voltage at the reset port from resetting the circuitry, until the circuitry receives a discharge inhibition signal using the wireless communication component. The power source includes a rechargeable power source. The tag further comprises at least a charge pin electrically coupled to the rechargeable power source and terminating at an outside of the housing, and a data interface including first and second data pins electrically coupled to the circuitry and terminating at the outside of the housing. The first data pin is configured for carrying to the circuitry a voltage applied to the charge pin, and wherein the second data pin is configured for communicating a charging status to the circuitry.

In a second aspect, a tag includes: a housing configured for coupling the tag to a physical object to organize activities regarding the physical object; and coupled to the housing: a wireless communication component; circuitry electrically coupled to the wireless communication component; a rechargeable power source electrically coupled to the wireless communication component and the circuitry; at least a first charge pin electrically coupled to the rechargeable power source and terminating at an outside of the housing; and a data interface including first and second data pins electrically coupled to the circuitry and terminating at the outside of the housing.

Implementations can include any or all of the following features. The tag further comprises a second charge pin terminating at the outside of the housing. The first data pin is configured for carrying to the circuitry a voltage applied to the charge pin. The second data pin is configured for communicating a charging status to the circuitry. The circuitry includes a reset port and a switch port, the tag further comprising a first switch between the power source and the reset port, a second switch between the reset port and ground, the second switch controlled by the switch port, and a capacitor between the reset port and the ground.

In a third aspect, a system includes: a tag configured for being coupled to a physical object to organize activities regarding the physical object, the tag comprising: a first housing; and coupled to the first housing, a wireless communication component, a first memory, and a first processor coupled to the wireless communication component and configured for adapting a behavior of the tag; and an accessory comprising a second housing configured for being coupled to the first housing of the tag, the accessory comprising a second memory and a second processor configured for interacting with the first processor of the tag.

Implementations can include any or all of the following features. The tag further includes a power source, a reset port and a switch port coupled to the first processor, a first switch between the power source and the reset port, a second switch between the reset port and ground, the second switch controlled by the switch port, and a capacitor between the reset port and the ground. The accessory further includes a sensor coupled to the second processor, the second processor configured to adapt a behavior of the tag based on an output of the sensor. The output of the sensor indicates at least one of: moisture, humidity, temperature, pressure, altitude, acoustics, wind speed, strain, shear, magnetic field strength and/or orientation, electric field strength and/or orientation, electromagnetic radiation, particle radiation, compass point direction, or acceleration. The tag further comprises a rechargeable power source, a charge pin electrically coupled to the rechargeable power source and terminating at an outside of the first housing, and a data interface including first and second data pins electrically coupled to the circuitry and terminating at the outside of the first housing. The accessory further comprises a first power source. The first power source includes a solar panel mounted to the second housing.

BRIEF DESCRIPTION OF DRAWINGS

Like reference symbols in the various drawings indicate like elements.

DETAILED DESCRIPTION

Figure 1A:
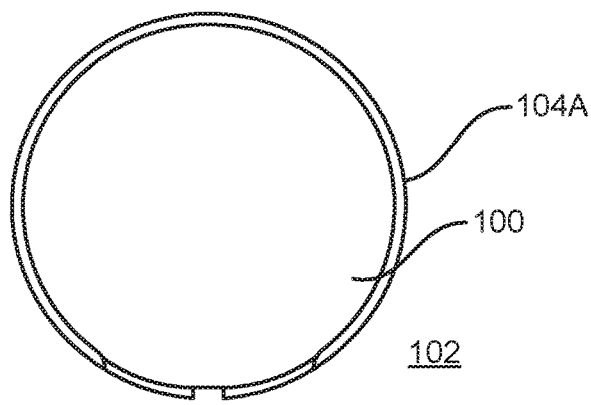
FIG. 1A shows an example top view of a face of a tag configured for organizing activities regarding a physical object.

This document describes examples of systems and techniques that allow for intelligently organizing physical objects using wireless tags. In some implementations, a tag has an improved reset function that can reduce the likelihood of accidental resetting. For example, a hold-to-reset function can be paired with a signal from a processing device to ensure that the reset is carried out. In some implementations, a tag with a rechargeable power source can feature at least one charging contact, and also a data interface of two or more contacts that can facilitate communication of charging state information and/or commands regarding the charging to or from the tag.

As used herein, a tag is a wireless device with processing capability and configured to be attached to, embedded in, or otherwise coupled to a physical object to facilitate organizing or tracking of at least the presence, proximity, and movement of that physical object. The tag can include a wireless communication component that serves to transmit data packets over wireless (e.g., radio) signals from time to time (e.g., as a beacon), or to receive data packets over the signal(s) from another tag and/or from a processing device.

A platform may include multiple tags configured for being attached to, embedded within, or otherwise coupled to respective physical objects. Some tags can be configured to a logical structure such as a grouping or a structural hierarchy wherein one or more tags serve as a "parent tag" to one or more other tags which can be referred to as "child tags". As used herein, a tag is considered a parent tag if it controls the organizing of at least one other tag. As used herein, a tag is a child tag if the organizing of the tag is controlled by at least one other tag. The child tag can have the same or a different (e.g., less complex) configuration of hardware and/or software (e.g., operating system, applications, firmware, etc.) than the parent tag. A processing device can serve to connect with multiple tags (e.g., parent tags), react to information received from them, and issue queries, requests, or other commands to the tags. For example, the processing device may at least in part be implemented in the form of a smartphone and/or tablet executing a particular application or operating system. As another example, the processing device may at least in part be implemented in the form of a dedicated stand-alone device (sometimes referred to as a "hub" in the system). As another example, the processing device may at least in part be implemented in the form of one or more remote processing devices (e.g., a cloud solution). In some implementations, an intelligence engine can be implemented on one or more processing devices in the cloud. For example, the intelligence engine may contextualize one or more activities with external factors such as time of day, nature of interaction, location of interaction, weather and external conditions, and/or permissions and relationships between entities (e.g., tags, physical objects, and/or persons) to create experiences that leverage the collective understanding of the system.

FIG. 1A shows an example top view of a face 100 of a tag 102 configured for organizing activities regarding a physical object. The tag 102 can be used with one or more other examples described elsewhere herein. In some implementations, the tag 102 can include one or more of the components of the tag 200 (FIG. 2) to be described below.

The face 100 is here formed on a housing 104A of the tag 102. The housing 104A can include one or more suitable materials that allow the tag 102 to be coupled to a physical object for the purpose of organizing activities with regard to that physical object. In some implementations, the housing 104A includes metal and/or a polymer material, such as a plastic material that can be injection molded into a suitable shape.

The tag 102 can have any shape, and the face 100 is here shown with a generally circular shape in the present top view. In some implementations, the tag 102 can have another shape, including, but not limited to, a polygonal, rectangular, square, triangular, hexagonal, octagonal, or an irregular shape.

Figure 1B:
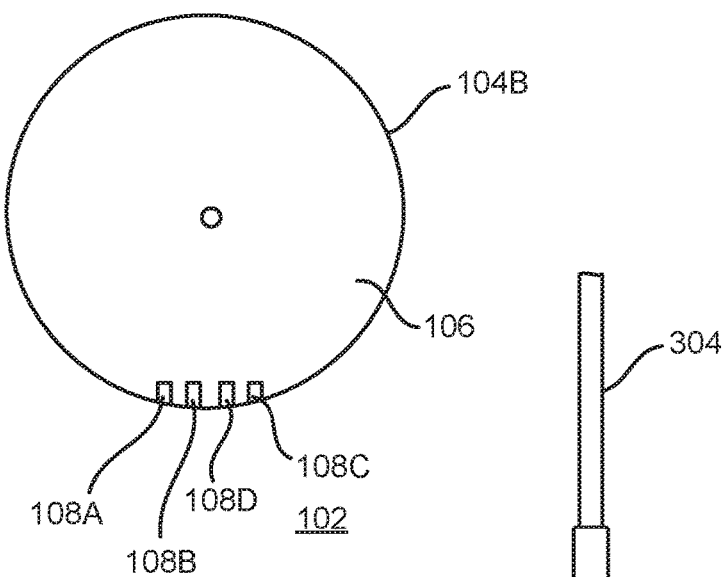
FIG. 1B shows an example top view of another face of the tag of FIG. 1A.

FIG. 1B shows an example top view of another face 106 of the tag 102 of FIG. 1A. The other face 106 is part of a housing 104B and can be positioned opposite the face 100 (FIG. 1A) on the tag 102. The housing 104B can be made of the same material(s) as the housing 104A. In some implementations, the housings 104A-B can be complementary components that are separately manufactured (e.g., by injection molding) and then assembled into the housing for the tag 102. For example, the housings 104A-B can be clamshell components that when assembled together form an enclosure surrounding an (at least partially enclosed) inner space where one or more components of the tag 102 can be contained.

The tag 102 can include one or more external electrically conductive pins. Here, pins 108A-D are positioned on an outside of the housing 104B. For example, the pins 108A-D are here positioned at an edge of the tag 102. In some implementations, the pins 108A-D can be used for power supply and/or data transmission to and/or from the circuitry of the tag 102. For example, two of the pins 108A-D can be charging pins and the other two can form a data interface for the tag 102.

Figure 2:
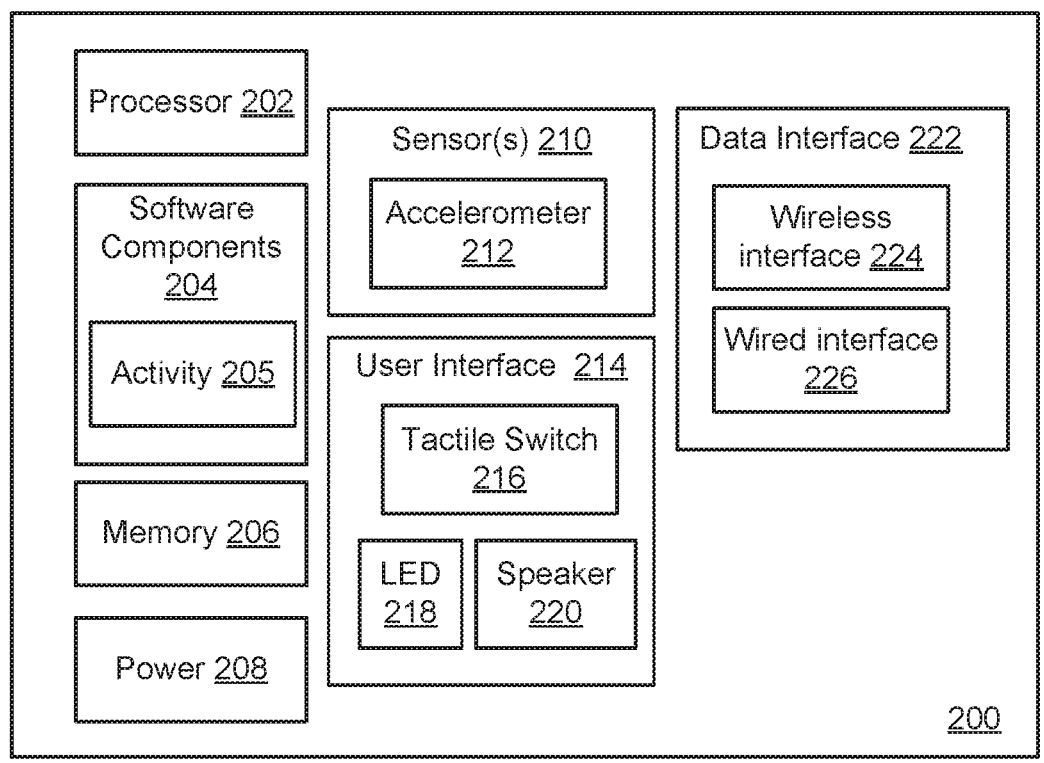
FIG. 2 shows a block diagram of an example of a tag.

FIG. 2 shows a block diagram of an example of a tag 200. The tag 200 can be implemented using one or more examples described with reference to FIG. 14. The tag 200 can be implemented substantially inside a housing that facilitates attachment of the tag 200 to, or otherwise coupling the tag 200 with, a physical object. For example, the housing can include one or more enclosures serving to contain at least some of the components of the tag 200 as a cohesive unit. The tag 1202 and/or the tags 1204A-C can be implemented using the tag 200. Solely as an example, and without limitation, such housing can have a thickness that is on the order of a few mm, and or a greatest width in any dimension that is on the order of tens of mm. For example, the housing can be an essentially circular disc. An identifier (e.g., a QR code) can be affixed to the housing to aid in identification and/or a setup process.

The tag 200 can be attached to, embedded within, or otherwise coupled to the physical object in one or more ways. For example, the tag 200 can be provided with an adhesive on the housing that couples to a surface on the physical object. As another example, the tag 200 can be provided with a holder that attaches to the tag 200, the holder having a loop (e.g., a keyring) for being coupled to the physical object.

The tag 200 can include at least one processor 202. The processor 202 can be semiconductor-based and can include at least one circuit that performs operations at least in part based on executing instructions. The processor 202 can be a general purpose processor or a special purpose processor.

The tag 200 can include one or more software components 204. The software components 204 can include software (e.g., firmware). In some implementations, the software components 204 includes an activity component 205 that can control one or more aspects of operation by the tag 200. For example, the activity component 205 can include some or all functionality described with reference to the activity management module 1216 (FIG. 12) or the contextual engine 1220. The software components 204 can be formulated using one or more programming languages that facilitate generation of instructions comprehensible to the processor 202.

The tag 200 can include at least one memory 206. The memory 206 can store information within the tag 200. The memory 206 can be implemented in the form of one or more discrete units. The memory 206 can include volatile memory, non-volatile memory, or combinations thereof.

The tag 200 can include a power supply 208. The power supply 208 can power some or all of the components of the tag 200 or other components not shown. In some implementations, the power supply 208 includes one or more electrochemical cells (e.g., a lithium-ion cell) capable of storing energy in chemical form and allowing consumption of that energy by way of conversion into electrical current. In some implementations, the power supply 208 includes a capacitor capable of storing energy in an electric field. The power supply 208 can be rechargeable (e.g., by external power from a voltage/current source, or from a solar cell) or non-rechargeable. For example, the power supply 208 can be recharged by electrically connecting a power source to physical pins that contact the power supply 208. As another example, the power supply 208 can be recharged wirelessly (e.g., by inductive charging). Kinetic energy harvesting and/or thermal energy harvesting may be used. In some implementations, a near-field communication (NFC) coil can also be used as a charging coil for inductive charging. For example, the power supply 208 can be recharged wirelessly in near proximity (e.g., by inductive coupled charging using internal dedicated coil or reusing an NFC coil for charging). As another example, the power supply 208 can be recharged wirelessly in far field (e.g., by electric field charging) or using energy harvesting techniques from multiple ambient sources, including kinetic or bio-mechanical sources (e.g., a piezo electric generator sensing vibration or thermo-electric generator (TEG) which harvests energy from temperature gradient). In some implementations, ambient backscatter energy may be used to power the tag directly (e.g., in lieu of using an electrochemical cell to store energy).

The tag 200 can include one or more sensors 210. The sensor(s) 210 can be configured to detect one or more characteristics of the environment or other surrounding to which the tag 200 is subjected. The sensor(s) 210 can detect one or more aspects including, but not limited to, moisture, humidity, temperature, pressure, altitude, acoustics, wind speed, strain, shear, magnetic field strength and/or orientation, electric field strength and/or orientation, electromagnetic radiation, particle radiation, compass point direction, or acceleration. Here, for example, the sensor 210 includes an accelerometer 212. For example, the accelerometer 212 may be used to detect if the tag 200 is in motion, and the processor 202 of the tag 200 may decide to change the behavior of the tag 200 based on the motion detected. For example, the beaconing pattern of the wireless interface 224 may be increased when the tag 200 is determined to be moving. Collection of data (e.g., one or more signals) from the sensor(s) 210 can be considered harvesting of information that can be the basis for deterministic behavior, predictive behavior, and/or adaptive behavior in the system in which the tag 200 is implemented.

The sensor(s) 210 can be used to adapt the behavior of the tag 200 in one or more ways. In some implementations, the tag 200 can change its mode based on the output (or the absence of output) from at least one of the sensors 210. For example, the sensor 210 while in a resting mode can detect that the tag 200 is currently being exposed to water. One or more rules applicable to the tag 200 can define that the physical object to which the tag 200 is coupled should not be exposed to water (or moisture). In some implementations, application of the rule(s) based on the present sensor output can trigger the tag 200 to change its state from the resting mode (which may have involved communicating relatively seldom) into a panic mode. For example, the panic mode can involve sending a communication (e.g., more frequently than during the resting mode) to a processing component associated with the tag 200. As another example, the panic mode can involve the tag 200 generating one or more perceptible outputs, including, but not limited to, sounding an alarm and/or illuminating a light.

The tag 200 can apply one or more energy management techniques. In some implementations, energy consumption can be managed by having the tag react only to changes that are meaningful in the present context of the tag. In such scenarios, the same or a similar output from the sensor(s) 210 can trigger different responses depending on circumstances. In some implementations, the tag 200 can be considered a portable tag if it is coupled to a physical object that is intended to be moved to different locations at least occasionally. A tag on a bag is only one example of a portable tag. In some implementations, the tag 200 can be considered a fixed tag if it is coupled to a physical object that is not intended to be moved to a different location during its lifetime, although the physical object may be subject to some motion at its current location. A tag on a drawer in a kitchen cabinet is only one example of a fixed tag. For example, movement of the portable tag can trigger the portable tag to check its areas of responsibility (e.g., any child tags as described with reference to FIG. 12). As another example, while the fixed tag may be moved from time to time (e.g., when the drawer is opened or closed), the fixed tag may wait until after the movement has ceased before checking on its areas of responsibility.

The tag 200 may include one or more user interfaces 214. The user interface(s) 214 can facilitate one or more ways that a user can make input to the tag 200 and/or one or more ways that the tag 200 can make output to a user. In some implementations, the user interface 214 includes a tactile switch 216. For example, activating the tactile switch can open and close an electric circuit on the tag 200, thus providing input to the tag 200. In some implementations, the user interface 214 includes at least one light-emitting diode (LED) 218. The LED 218 can illuminate using one or more colors to signal a status of the tag 200 or of another tag, and/or to convey an instruction to the user. A red-blue-green LED can be used for the LED 218. In some implementations, the LED 218 can indicate power and/or pairing status during setup of the tag 200. In some implementations, the LED 218 can confirm the presence or absence of one or more child tags. In some implementations, the user interface 214 includes at least one speaker 220. The speaker 220 can emit one or more portions of audio to signal a status of the tag 200 or of another tag, and/or to convey an instruction to the user. For example, the speaker 220 can include an audio piezo buzzer.

The tag 200 may include at least one data interface 222. Here, the data interface 222 is shown as including a wireless interface 224 and a wired interface 226. The data interface 222 can facilitate communication between the tag 200 and at least one component in a system, such as during operation or a software update. For example, the data interface 222 can facilitate the wireless signal 1210 (FIG. 12) between the tag 1202 and the processing device 1208. As another example, the data interface 222 can facilitate one or more of the wireless signals 1206A-C between the tag 1202 and the tags 1204A-C. In some implementations, the data interface 222 can be configured for short-distance communications (e.g., in a personal-area or near-me network). In some implementations, the data interface 222 can be also or instead be configured for longer-distance communications (e.g., in a local-area or wide-area network). For example, and without limitation, the data interface 222 can operate in accordance with the principles of one or more of Bluetooth communication, Bluetooth Low Energy (BLE) communication, Zigbee communication, Wi-Fi communication, Long-Term Evolution (LTE) communication, NFC, or Narrow-Band (NB).

The data interface 222 (e.g., the wired interface 226) can make use of physical pins on the tag 200. In some implementations, the physical pins at least partially extend beyond the hull of a housing that contains the tag 200 so that the physical pins can be contacted by another component. In some implementations, the physical pins relating to the data interface 222 can be grouped with physical pins relating to the power supply 208 (e.g., to be used in recharging). For example, the physical pins relating to the data interface 222 can be used to trigger the tag 200 to be ready to receive electrical input on the physical pins relating to the power supply 208.

The tag 200 can include at least one bus or other communication component that facilitates communication between two or more of the processor 202, software components 204, memory 206, sensor(s) 210, user interface 214, and/or data interface 222.

Figure 12:
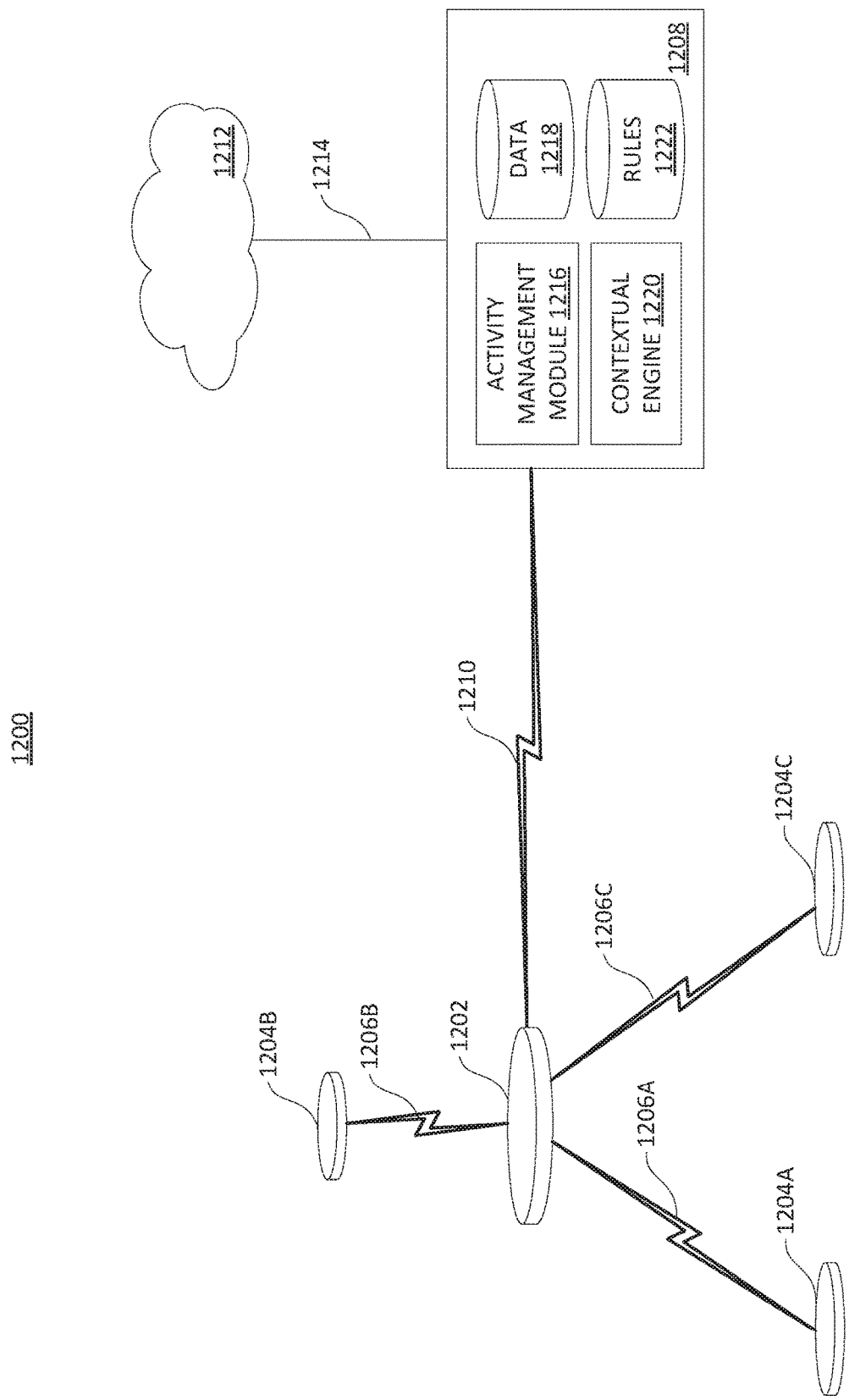
FIG. 12 shows an example operating environment in which a system can track physical items.

The tag 200 can be implemented as an intelligent device that can be used for personal tracking and organization. The tag 200 can be configured to communicate directly (or indirectly, such as via a network) with one or more instances of the tag 200, such as with a child tag when the tag 200 is considered a parent tag, or with a parent tag when the tag 200 is considered a child tag. The tag 200 can be configured for direct/indirect communication with a processing device (e.g., the processing device in FIG. 1, a third-party IoT device, and/or a cloud server (e.g., the cloud 1212 in FIG. 12). The tag 200 can be configured to generate and record state information. For example, the tag 200 can record events that relate to the tag 200 and/or to another tag. The tag 200 can represent a single object (e.g., the physical object to which the tag 200 is attached) or a group of objects (e.g., the physical objects to which respective child tags are attached when the tag 200 is considered a parent tag). The tag 200 can be configured to have one or more relationships with another instance of the tag 200, with a person (e.g., an owner or user), and/or with a location. For example, such relationships can be defined in the rules 1222 (FIG. 12).

The tag 200 can be used to track essentials (e.g., physical objects of significance) and for personal organization. The tag 200 can help a user quickly locate the physical object to which the tag 200 is attached. The tag 200 can serve as a parent tag for one or more child tags (e.g., instances of the tag 200) within a group solution, which can allow for tracking of the presence, proximity, and movement of other physical objects. The tag 200 can serve as a location marker. For example, this can be exploited by a location service designed to provide indications to the location of wireless-enabled devices.

Examples herein mention that a tag can serve as a child tag to another tag, which can be considered the parent tag. In some implementations, the child tag is implemented with all components of the tag 200, optionally with more components. In some implementations, the child tag can have fewer than all of the components of the tag 200. For example, the power supply 208 in the child tag may be non-rechargeable. As another example, the child tag may not have one or more of the sensor(s) 210 (e.g., the accelerometer 212 can be omitted). As another example, the LED 218 in the child tag can be a single-color LED (e.g., white). As another example, the child tag may not have the speaker 220. As another example, the child tag may not have the wired interface 226. For example, no physical data pins may be present on the housing of the child tag.

In operation, the child tag (e.g., including some or all of the components of the tag 200) can be used to organize a range of physical objects, including all everyday essentials that a person may have. The parent tag (e.g., including some or all of the components of the tag 200) can monitor the child tag(s) to which it is connected. As such, the parent tag can indicate the presence of a physical object to which the child tag is attached/coupled based on the child tag's proximity to the parent tag. For example, the parent tag can send a message indicating whether the child tag is within the range of the parent tag or not within the range of the parent tag.

Examples herein illustrate that a tag (e.g., the tag 200) can have an awareness of circumstances. Aspects of the awareness can be categorized as being either internal or external. An internal awareness may pertain to the physical object itself. In some implementations, the internal awareness can be further separated into preset state values and dynamic state values. Preset state values can include, but are not limited to, make, model, manufacturing date, unique identifier (UID), device info, object type, or manufacturer's suggested retail price (MSRP). Dynamic state values can include, but are not limited to, battery level, power consumption, market value, directive, beaconing rate, communications frequency, communications protocol, object relationship logic, owner identity, permissions, internal clock, motion, or orientation.

An external awareness can relate to factors externally related to the physical object. External factors can include, but are not limited to, relative location, geo location, time, sensor data, objects nearby, proximity, relative motion of objects nearby, or duration of any states.

Figure 3:
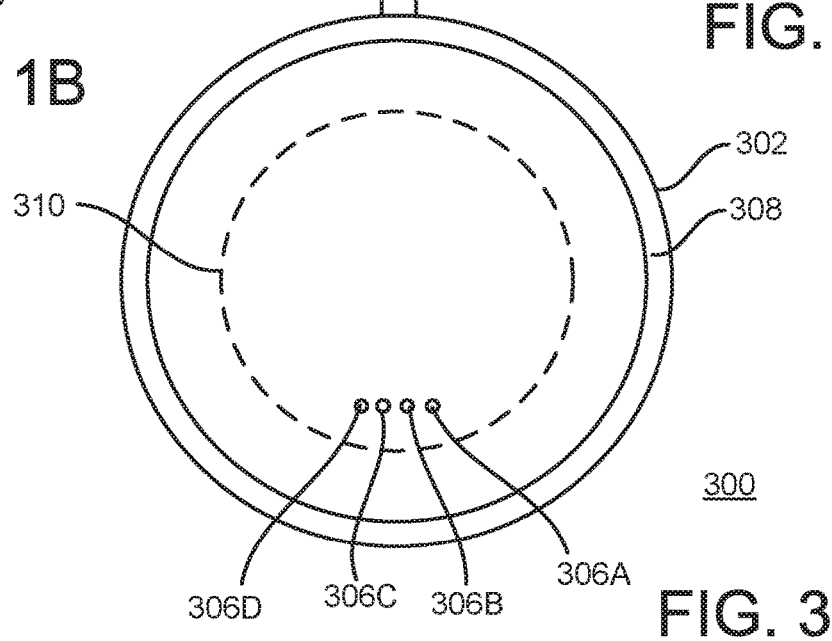
FIG. 3 shows an example of a charger that can be used with a tag.

FIG. 3 shows an example of a charger 300 that can be used with a tag. The charger 300 can be used with one or more other examples described elsewhere herein. The charger 300 can include one or more transformers or other adapters configured to convert alternating current (AC) into direct current (DC) of suitable characteristics to be supplied to a tag (e.g., the tag 102 in FIGS. 1A-B) to recharge a power source of the tag (e.g., a lithium-ion battery or other electrolytic cell).

The charger 300 here includes a housing 302 and a cable 304 that is only partly shown in the present illustration. The housing can be made from one or more suitable materials, including, but not limited to, metal or a polymer material. The housing 302 can at least partially contain circuitry of the charger. For example, a connector (e.g., a universal serial bus plug) can be integrated with the cable 304 and provide DC to the charger 300. As another example, an AC-DC converter can be included within the housing 302 or within a unit (not shown) integrated with the cable 304 (e.g., an adapter configured for an AC outlet).

The charger 300 can include one or more external electrically conductive pins. Here, the charger 300 includes pins 306A-D. In some implementations, the pins 306A-D are configured to be electrically coupled with the pins 108A-D (FIG. 1B), respectively, when the tag 102 is placed against (e.g., on top of) the charger 300. For example, a face 308 of the charger 300 that is visible in the present view can have a depression 310 corresponding to the shape of the tag so as to help position the tag correctly in relation to the pins 306A-D.

Figure 4:
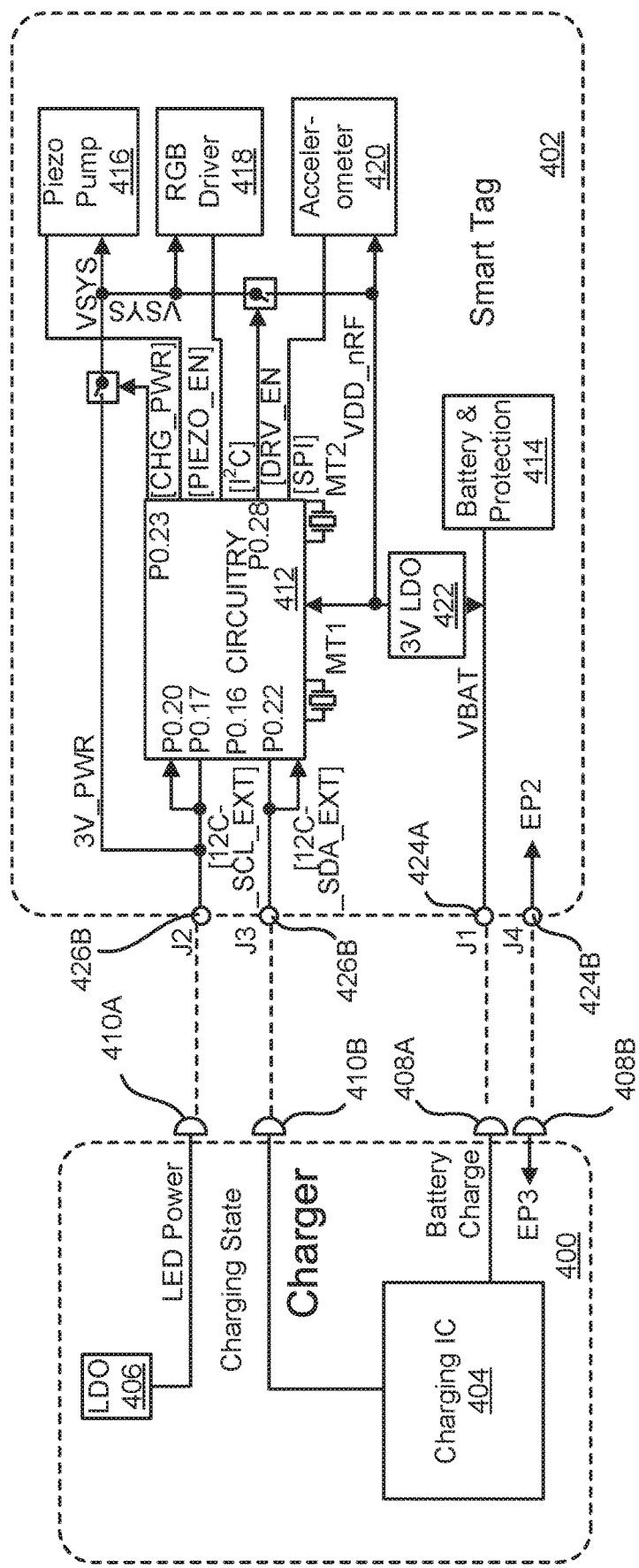
FIG. 4 shows an example of a charger and a tag.

FIG. 4 shows an example of a charger 400 and a tag 402. The charger 400 and/or the tag 402 can be used with one or more other examples described elsewhere herein. The charger 400 can be implemented based on one or more examples described with regard to the charger 300 in FIG. 3. The tag 402 can be implemented based on one or more examples described with regard to the tag 200 in FIG. 2.

The charger 400 here includes an integrated circuit (IC) 404. For example, the IC 404 can be configured to perform battery charging by way of a combination of one or more of: a conditioning phase, a constant-current phase, or a constant-voltage phase.

The charger 400 here includes a voltage regulator 406. In some implementations, the voltage regulator 406 is a low-dropout (LDO) regulator.

The charger 400 here includes pins 408A-B and 410A-B. For example, each of the pins 408A-B and 410A-B can correspond to a respective one of the pins 306A-D in FIG. 3. Here, the pin 408A is coupled to the IC 404 to serve as a charging pin, and the pin 408B is coupled to ground. The pin 410A is here coupled to the voltage regulator 406, such as to provide LED power for the tag 402. The pin 410B is here coupled to the IC 404, such as to convey a charging state of the IC 404 to the tag 402.

The tag 402 here includes circuitry 412. In some implementations, the circuitry 412 can include at least the processor 202, memory 206, and the wireless interface 224 in FIG. 2. For example, the circuitry 412 can include a system-on-a-chip (SoC) capable of wireless communication.

The tag 402 here includes a battery 414 that is rechargeable to supply power to components of the tag 402. In some implementations, one or more protective features are incorporated in the battery 414. For example, the battery 414 may include one or more lithium-ion cells.

The tag 402 here includes a piezo pump 416. In some implementations, the piezo pump 416 is configured to drive one or more piezo sounders. For example, the piezo pump 416 can drive the speaker 220 in FIG. 2.

The tag 402 here includes a red-green-blue (RGB) driver 418. In some implementations, the RGB driver 418 can include circuitry to power one or more LEDs of the tag 402. For example, the RGB driver 418 can drive the LED 218 in FIG. 2.

The tag 402 here includes an accelerometer 420. In some implementations, the accelerometer 420 can operate similarly or identically to the accelerometer 212 in FIG. 2.

The tag 402 here includes a voltage regulator 422. In some implementations, the voltage regulator 422 in the tag 402 can be identical or similar to the voltage regulator 406 in the charger 400.

The tag 402 here includes pins 424A-B and 426A-B. For example, each of the pins 424A-B and 426A-B can correspond to a respective one of the pins 108A-D in FIG. 1. Here, the pin 424A is coupled to the battery 414 to facilitate charging. The pin 424B is here coupled to ground in the tag 402. The pins 424A-B may be considered the charging pins of the tag 402 and may terminate at an outside of the housing of the tag 402.

The pin 426A is here coupled to data ports on the circuitry 412 and to the piezo pump 416, the RGB driver 418, and the accelerometer 420. The pin 426B is here coupled to data ports on the circuitry 412. The pins 426A-B can serve as data pins of the tag 402. For example, the pins 426A-B together may be considered a data interface of the tag 402 and may terminate at an outside of the housing of the tag 402.

As indicated in the illustration, when the charger 400 and the tag 402 are brought into contact for charging, the pins can electrically contact each other as follows:
pin 410A—pin 426A
pin 410B—pin 426B
pin 408A—pin 424A
pin 408B—pin 424B In some implementations, the charger 400 can use the pin 410A to inform the tag 402 that the tag 402 is connected to a charger, as opposed to a non-charging component, such as a data transfer component. For example, the voltage regulator 406 can carry the voltage (e.g., a constant voltage) that the IC 404 is applying to the pins 424A-B (i.e., the charging pins) to the pin 426A of the data interface of the tag 402 and thereby to the circuitry 412.

The charger 400 can use the pin 410B to communicate a charging status to the circuitry 412 of the tag 402. In some implementations, a signal on the pin 410B can convey whether the charger 400 is currently charging the tag 402, or whether the tag 402 is currently in a charged state. For example, the charger 400 can continue charging the battery 414 until a state-of-charge reaches a threshold value.

The tag 402 is an example of a tag that includes a housing (e.g., the housing 104A-B in FIGS. 1A-B) configured for coupling the tag to a physical object to organize activities regarding the physical object. Coupled to the housing, the tag includes a wireless communication component (e.g., the wireless interface 224 in FIG. 2), circuitry (e.g., the circuitry 412) electrically coupled to the wireless communication component, a rechargeable power source (e.g., the battery 414) electrically coupled to the wireless communication component and the circuitry, at least a first charge pin (e.g., the pin 424A) electrically coupled to the rechargeable power source and terminating at an outside of the housing, and a data interface (e.g., the pins 426A-B) including first and second data pins electrically coupled to the circuitry and terminating at the outside of the housing.

Figure 5:
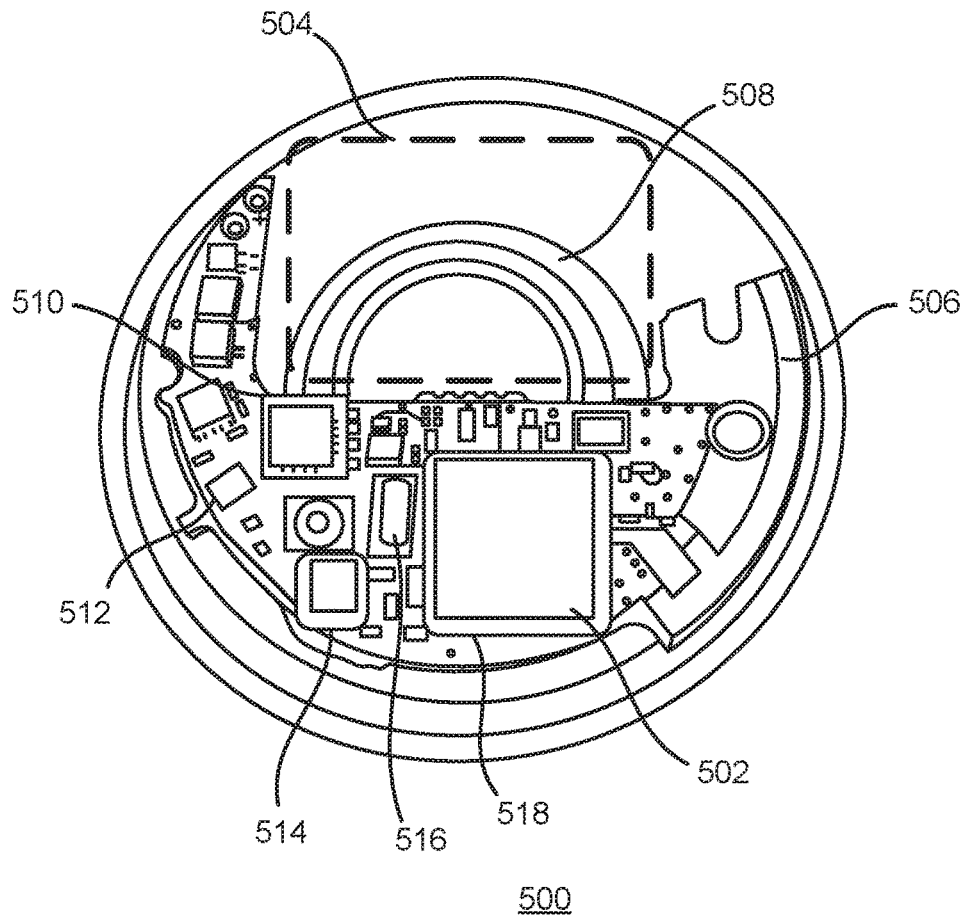
FIG. 5 shows examples of components of a tag.

FIG. 5 shows examples of components of a tag 500. The tag 500 can be used with one or more other examples described elsewhere herein. The tag 500 can be implemented based on one or more examples described with regard to the tag 200 in FIG. 2. The tag 500 is here shown in a partially assembled (or disassembled) state for purposes of illustration only.

Here, the tag 500 includes an SoC 502. In some implementations, the SoC includes circuitry and at least one wireless component to provide wireless communication to or from the tag 500 to facilitate organizing of a physical component to which the tag 500 is coupled.

Here, the tag 500 includes a power source 504 that is schematically illustrated using a dashed outline for clarity. In some implementations, the power source 504 is rechargeable. For example, the power source 504 can include at least one lithium-ion cell.

Here, the tag 500 includes an antenna 506. The antenna 506 is coupled to the SoC 502 for receiving and/or transmitting wireless signals.

Here, the tag 500 includes a piezo buzzer 508 that the tag 500 uses for generating audible output. In some implementations, the piezo buzzer 508 can be driven by a piezo pump amplifier 510. For example, the piezo pump amplifier 510 can serve the same or similar purposes as the piezo pump 416 in FIG. 4.

Here, the tag 500 includes an LED 512. In some implementations, the LED 512 can serve the same or similar purposes as the LED 218 in FIG. 2.

Here, the tag 500 includes an accelerometer 514. In some implementations, the accelerometer 514 can serve the same or similar purposes as the accelerometer 212 in FIG. 2.

Here, the tag 500 includes a tactile switch 516. In some implementations, the tactile switch can be actuated using a button that is available from an outside of the tag 500. For example, the tactile switch 516 can serve the same or similar purposes as the tactile switch 216 in FIG. 2.

Each of the SoC 502, power source 504, antenna 506, piezo buzzer 508, piezo pump amplifier 510, LED 512, accelerometer 514, and tactile switch 516 is coupled to at least one other component of the tag 500 to operate. In some implementations, a circuit board 518 is included in the tag 500. For example, some or all of the SoC 502, power source 504, antenna 506, piezo buzzer 508, piezo pump amplifier 510, LED 512, accelerometer 514, and tactile switch 516 are connected to the circuit board 518.

Figure 6:
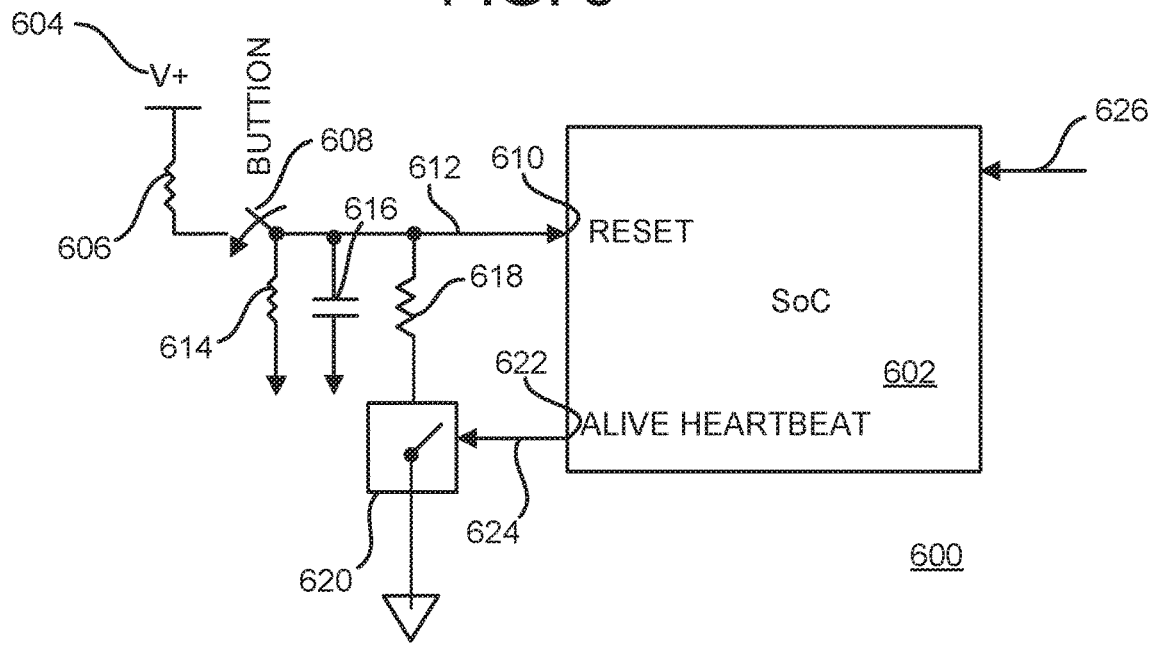
FIG. 6 shows an example of circuitry that can provide hold-to-reset functionality.

FIG. 6 shows an example of circuitry 600 that can provide hold-to-reset functionality. The circuitry 600 can be used with one or more other examples described elsewhere herein. The circuitry 600 can be implemented in the tag 200 in FIG. 2 or in another tag described herein.

The circuitry 600 here includes an SoC 602. In some implementations, the SoC 602 includes the processor 202, memory 206, and wireless interface 224 of FIG. 2. For example, the SoC 602 can serve the same or similar purposes as that SoC 502 in FIG. 5.

The circuitry 600 here includes a power source 604 schematically indicated as "V+". In some implementations, the power source 604 provides power of a constant voltage to the SoC 602. For example, the power source 604 can include a rechargeable battery.

The circuitry 600 here includes a resistor 606 coupled to the power source 604. The resistor 606 can be a fixed or variable resistor.

The circuitry 600 here includes a switch 608 coupled to the resistor 606. In some implementations, the switch 608 may serve the same or similar purposes as the tactile switch 216 in FIG. 2. For example, the switch 608 can be controlled by a button that is accessible to a user on the outside of the housing 104A (FIG. 1A) and/or 104B (FIG. 1B).

The SoC 602 here includes a reset port 610. In some implementations, the reset port is active high. For example, if a voltage on a conductor 612 coupled to the reset port 610 reaches a predefined threshold, this causes the SoC 602 to reset. The switch 608 is here coupled to the reset port 610 by the conductor 612.

The circuitry 600 here includes a resistor 614 coupled to the terminal of the switch 608 that is coupled to the reset port 610 by the conductor 612. Another terminal of the resistor 614 is coupled to ground.

The circuitry 600 here includes a capacitor 616 coupled to the terminal of the switch 608 that is coupled to the reset port 610 by the conductor 612. Another terminal of the capacitor 616 is coupled to ground.

The circuitry 600 here includes a resistor 618 coupled to the terminal of the switch 608 that is coupled to the reset port 610 by the conductor 612.

The circuitry 600 here includes a switch 620 that is coupled to the other terminal of the resistor 618. Another terminal of the switch 620 is coupled to ground.

The SoC 602 here includes a switch port 622. The switch port 622 controls the switch 620 to be open or closed. In some implementations, the switch port 622 sometimes generates a discharge signal 624 to the switch 620 as here schematically illustrated as an arrow.

The SoC 602 can receive a discharge inhibition signal 626 as here schematically illustrated as an arrow. In some implementations, the discharge inhibition signal 626 can be wirelessly sent from a processing device to the tag having the circuitry 600. For example, a user can trigger the processing device to generate the discharge inhibition signal 626.

Figure 7:
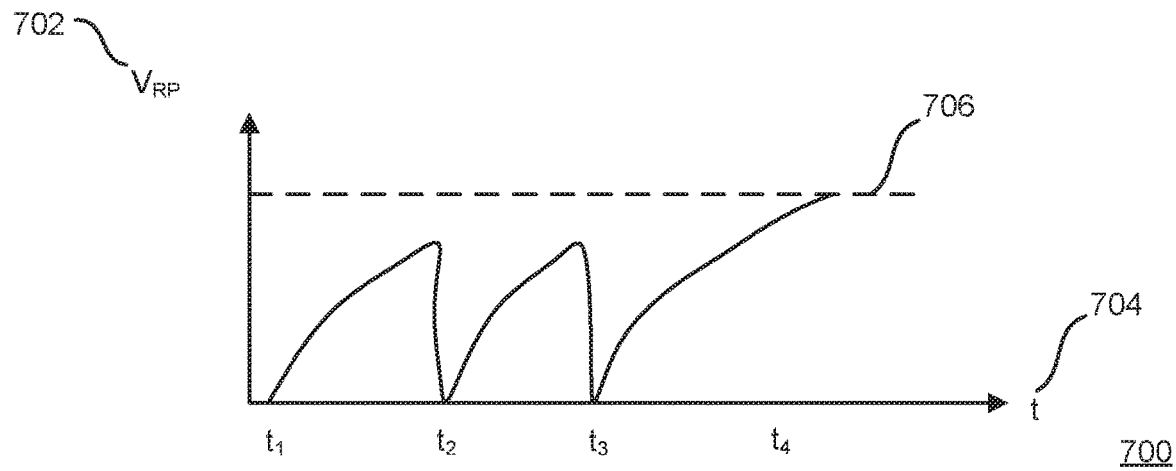
FIG. 7 shows an example graph of reset port voltage over time.
Figure 8:
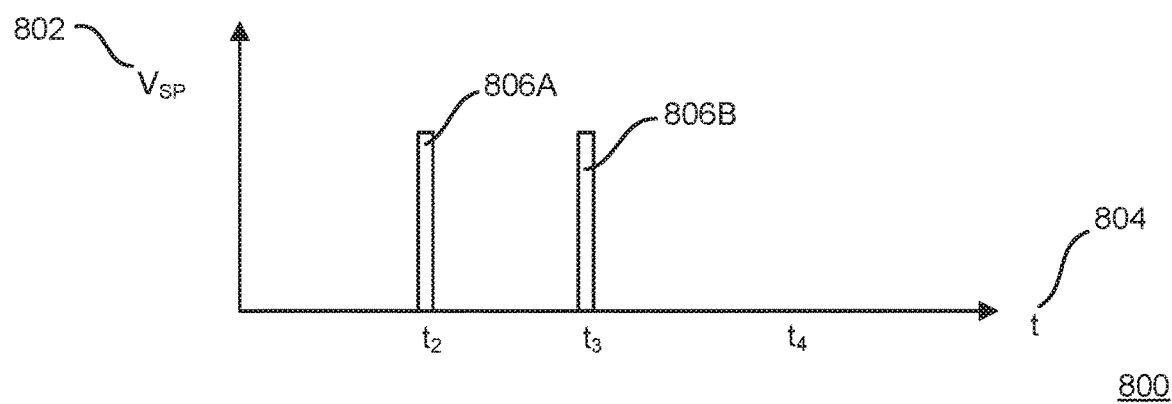
FIG. 8 shows an example graph of switch port voltage over time.

An example of operation of the circuitry 600 will now be provided. FIG. 7 shows an example graph 700 of reset port voltage (VRP) 702 over time 704. FIG. 8 shows an example graph 800 of switch port voltage (VSP) 802 over time 804. The graph 700 and/or 800 can be used with one or more other examples described elsewhere herein. In some implementations, the reset port voltage 702 may represent the voltage on the reset port 610 in FIG. 6. For example, a threshold 706 can be defined at which the reset port 610 will reset the SoC 602. In some implementations, the switch port voltage 802 may represent the voltage of the switch port 622 in FIG. 6.

When a user closes the switch 608 in FIG. 6 at a time $t_1$, the power source 604 becomes coupled to the reset port 610 by the conductor 612. At this time, the switch 620 is open. The power source 604 begins charging the capacitor 616 and the reset port voltage 702 therefore begins increasing at $t_1$. At around time $t_2$, a discharge signal 806A is generated at the switch port 622. This causes the switch 620 to close, thereby allowing the capacitor 616 to discharge through the resistor 618 to ground. Around the time $t_2$, the reset port voltage 702 therefore begins to drop and does not reach the threshold 706. Meanwhile, the power source 604 continues charging the capacitor 616 and the reset port voltage 702 therefore again begins increasing at around the time $t_2$. Similarly, a discharge signal 806B is generated at the switch port 622 at a time $t_3$ to close the switch 620 and discharge the capacitor 616 through the resistor 618 to ground. At around the time $t_3$, the reset port voltage 702 again begins increasing. In some implementations, the switch port 622 continues to generate the discharge signals 806A, 806B, etc., unless inhibited from doing so. For example, the SoC 602 may be configured to repeatedly generate the discharge signals 806A, 806B, etc., at the switch port 622 to discharge the capacitor 616 and prevent the reset port voltage from resetting the SoC 602, until the SoC 602 receives the discharge inhibition signal 626 using a wireless communication component.

Around a time $t_4$, no discharge signal is generated, as indicated in the graph 800. For example, no discharge signal is generated at the time $t_4$ because the discharge inhibition signal 626 in FIG. 6 is received by the SoC 602. The reset port voltage 702 therefore continues to increase at the time t4 because the capacitor 616 is not being discharged, and eventually reaches (e.g., exceeds) the threshold 706. When the threshold 706 is reached, the reset port 610 in FIG. 6 can reset the SoC 602. Accordingly, the circuitry 600 illustrates a hold-to-reset functionality where the user holds a button to close the switch 608, and wherein the resetting is thwarted by the discharge signal 624 unless the discharge inhibition signal 626 inhibits such discharge signal 624.

A tag having the circuitry 600 is an example of a tag having a housing (e.g., the housing 104A-B in FIGS. 1A-B) configured for coupling the tag to a physical object to organize activities regarding the physical object. Coupled to the housing, the tag includes: a wireless communication component (e.g., the wireless interface 224 in FIG. 2), circuitry (e.g., the circuitry 600) electrically coupled to the wireless communication component, the circuitry having a reset port (e.g., the reset port 610) and a switch port (e.g., the switch port 622), a power source (e.g., the power source 604) electrically coupled to the wireless communication component and the circuitry, a first switch (e.g., the switch 608) between the power source and the reset port, a second switch (e.g., the switch 620) between the reset port and ground, the second switch controlled by the switch port (e.g., by way of the discharge signal 624), and a capacitor (e.g., the capacitor 616) between the reset port and the ground.

Figure 9:
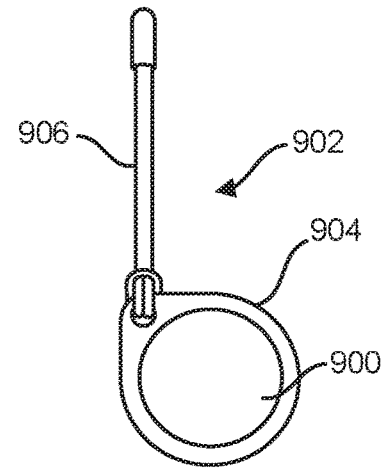
FIG. 9 shows an example of a tag and a holder.

FIG. 9 shows an example of a tag 900 and a holder 902. The tag 900 and/or holder 902 can be used with one or more other examples described herein. In some implementations, the tag 900 can correspond to the tag 102 in FIG. 1. The holder 902 includes a holder component 904 configured to surround at least part of the periphery of the tag 900 (e.g., by the tag 900 being snapped into, and removably held by, an opening in the holder component 904. The holder 902 includes a tie 906. In some implementations, the tie is configured to be removably attached to a physical object so as to couple the tag 900 to that physical object. For example, this can allow the tag 900 to be coupled to a physical object also when it may not be possible or practicable to directly attach (e.g., by adhesive) the tag 900 to the surface of that physical object.

Figure 10:
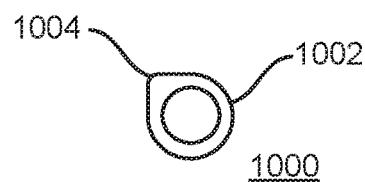
FIG. 10 shows another example of a tag.

FIG. 10 shows another example of a tag 1000. The tag 1000 can be used with one or more other examples described herein. In some implementations, the tag 1000 can correspond to the tag 102 in FIG. 1. The tag 1000 includes a housing 1002 that is in part circular and that has an angular portion 1004. In some implementations, the tag 1000 can have a smaller form factor than the tag 102 in FIGS. 1A-B.

Figure 11:
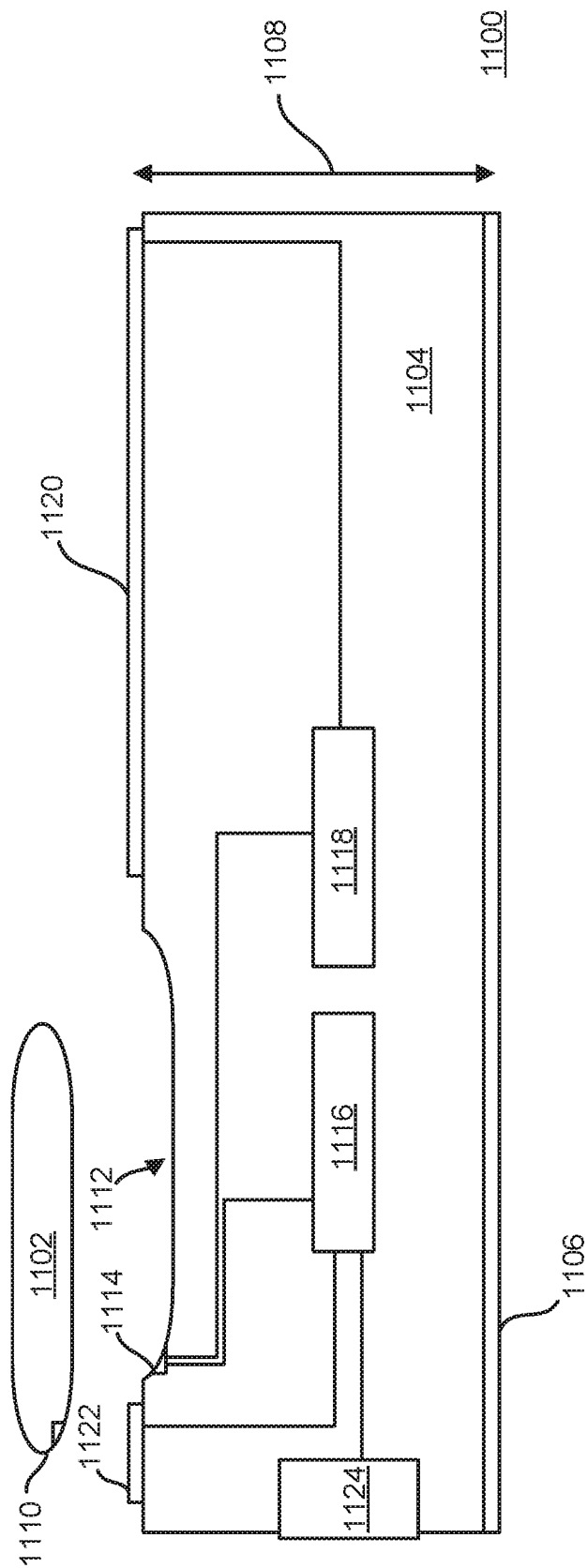
FIG. 11 shows an example of a system that includes a tag and a physical object.

FIG. 11 shows an example of a system 1100 that includes a tag 1102 and a physical object 1104. The tag 1102 and/or the physical object 1104 can be used with one or more other examples described herein. The tag 1102 can be implemented in accordance with some or all aspects of the tag 200 in FIG. 2. The physical object 1104 here schematically represents each of at least two types of possible scenarios regarding the tag 1102. In the first type of possible scenario, in some implementations, the physical object 1104 can be the physical object for which the tag 1102 is used. As such, the tag 1102 can be used for wirelessly organizing activities regarding the physical object 1104. The physical object 1104 may then include all, or some, or none of the components that will be exemplified below. In some implementations, the tag 1102 may be used in combination with the physical object 1104 to act as the "brain" of the physical object 1104. The physical object 1104 may be any type of physical object. Providing the tag 1102 may eliminate the need for a manufacturer of products such as the physical object 1104 to aggregate technology in its products (i.e., the physical object 1104) in which technology the manufacturer is not necessarily an expert, such as functionality regarding organizing the presence, proximity, movement, or duration relating to physical objects. In some implementations, the physical object 1104 is an oxygen tank. For example, the tag 1102 may function to aggregate, or process in another way, information that relates to the oxygen tank, such as data about the contents of the tank and/or the use thereof. In some implementations, the physical object 1104 is a bicycle. For example, the tag 1102 may function to aggregate, or process in another way, information that relates to the bicycle, such as signals regarding one or more sensors (e.g., for speed, power, and/or cadence measurements) or one or more electronic components (e.g., an electronic derailleur).

In the second type of possible scenario, in some implementations, the physical object 1104 can be an accessory to the tag 1102. For example, the system 1100 can be used to as to enhance the tag 1102 with one or more functionalities and/or characteristics. The system 1100 in such situations can be coupled to another physical object (not shown) so that the tag 1102 is used for wirelessly organizing activities regarding that other physical object. In such a scenario, the physical object 1104 and/or the tag 1102 can be coupled to the other physical object in any suitable way. For example, the physical object 1104 can have an adhesive 1106 on at least one surface that facilitates connection (permanent or removable) to the other physical object. In some such implementations, a thickness 1108 (e.g., a z-dimension) of the physical object 1104 can be lesser than indicated in the present illustration. For example, the physical object can be sufficiently thin to be characterized as a sleeve for the tag 1102.

The tag 1102 can have one or more pins 1110 on an outside of its housing. In some implementations, the pin(s) 1110 can serve for charging and/or data transmission. The pin(s) 1110 can correspond to one or more of the pins 424A-B or 426A-B in FIG. 4. For example, the pins 1110 may include charging pins and a data interface of one or more pins.

The physical object 1104 can include a receptacle 1112. In some implementations, the receptacle is a structure formed on or in a housing of the physical object 1104. For example, the receptacle 1112 can serve to releasably hold the tag 1102 against the physical object 1104. The physical object 1104 can include one or more pins 1114 within or adjacent the receptacle 1112. For example, the pin(s) 1114 can be configured to electrically contact one or more of the pins 1110 when the tag 1102 is held against the physical object 1104.

The physical object 1104 can include circuitry 1116. For example, the circuitry 1116 can include at least the processor 202 and memory 206 of FIG. 2, or the processing device 1402 and memory 1404 in FIG. 14. The circuitry 1116 can be coupled to the pin(s) 1114.

The physical object 1104 can include a power source 1118. In some implementations, the power source 1118 may include a rechargeable battery. For example, the power source 1118 can include at least one lithium-ion cell. In some implementations, the physical object 1104 is provided with a solar panel 1120 mounted to an outside of the housing of the physical object 1104. The solar panel 1120 can facilitate that power (originating from the sun or from artificial light) is be provided to one or more of: the power source 1118, the circuitry 1116 or another component of the physical object 1104, or to the tag 1102 (by way of the pin(s) 1114). This can allow the physical object 1104 to supplement an internal battery in the tag 1102. For example, the power source 1118 can be greater than a power source of the tag 1102 (e.g., the power supply 208 in FIG. 2).

The physical object 1104 can include a wireless communication component 1122. In some implementations where the tag 1102 may not have wireless capability, the wireless communication component 1122 can furnish that capability and facilitate use of the tag 1102 for organizing activities of one or more physical objects. For example, the tag 1102 can be considered the brains of the system 1100 that is coupled to the physical object 1104 to provide particular functionality that the physical object 1104 may otherwise not perform.

The physical object 1104 can include one or more sensors 1124. In some implementations, the output of the sensor(s) can control one or more aspects of the operation of the physical object 1104 and/or of the tag 1102. For example, a signal from the sensor(s) 1124 can be used for adjusting the behavior of the physical object 1104 and/or of the tag 1102. The sensor(s) 1124 can detect one or more aspects including, but not limited to, moisture, humidity, temperature, pressure, altitude, acoustics, wind speed, strain, shear, magnetic field strength and/or orientation, electric field strength and/or orientation, electromagnetic radiation, particle radiation, compass point direction, or acceleration.

The following is an example of how a system such as the system 1100 can be used. The physical object 1104 can be mounted to (e.g., be integrated with or attached to) a piece of personal property such as a suitcase. The physical object 1104 may then not have all the components of the physical object 1104 shown in FIG. 11. However, the physical object 1104 may include sufficient circuitry to communicate to the tag 1102 (e.g., by a data interface such as the pins 426A and/or 426B in FIG. 4) that the physical object 1104 is luggage (as opposed to another type of physical object). This information can allow the tag 1102 to change its behavior in one or more ways. For example, the tag 1102 can apply one or more luggage-related rules that may not otherwise be applicable, and the rule(s) may cause the tag 1102 to take action (or abstain from taking action) depending on one or more circumstances, including, but not limited to, based on output from the sensor(s) 1124 and/or a sensor of the tag 1102. In some implementations, the solar panel 1120 of the physical object 1104 can replenish an internal battery of the tag 1102, for example during a period of extended travel.

The system 1100 is an example of a system that includes a tag (e.g., the tag 1102) configured for being coupled to a physical object (e.g., the physical object 1104 or another physical object) to organize activities regarding the physical object. The tag includes a first housing (e.g., the housing 104A-B in FIGS. 1A-B), and coupled to the first housing: a wireless communication component (e.g., the wireless interface 224 in FIG. 2), a first memory (e.g., the memory 206 in FIG. 2), and a first processor (e.g., the processor 202 in FIG. 2) coupled to the wireless communication component and configured for adapting a behavior of the tag. The system includes an accessory (e.g., the physical object 1104) comprising a second housing configured for being coupled (e.g., by way of the receptacle 1112) to the first housing of the tag. The accessory includes a second memory and a second processor (e.g., in the circuitry 1116) configured for interacting with the first processor of the tag.

In some implementations, the tag 1102 of the system 1100 can include some or all components of the tag 402 in FIG. 4. For example, the tag 1102 may then have a rechargeable power source (e.g., the battery 414), a charge pin (e.g., the pin 424A in FIG. 4) electrically coupled to the rechargeable power source and terminating at an outside of the housing of the tag 1102, and a data interface (e.g., the pins 426A-B in FIG. 4) including first and second data pins electrically coupled to the circuitry of the tag 1102 and terminating at the outside of the housing of the tag 1102.

In some implementations, the tag 1102 of the system 1100 can include some or all components of the circuitry 600 in FIG. 6. For example, the tag 1102 can then include: the power source 604, the reset port 610 and the switch port 622 coupled to the processor of the tag 1102, the switch 608 between the power source 604 and the reset port 610, the switch 620 between the reset port 610 and ground, wherein the switch 620 is controlled by the switch port 622, and the capacitor 616 between the reset port 610 and the ground.

In some implementations, a technology platform can counteract the complexity often observed in IoT proliferation and can be used for optimization and cross communication of these and/or other smart devices. In some implementations, a foundational technology platform/stack can be designed to counteract the complexity of IoT proliferation and harness the power of shared information. For example, item-level data can be securely gathered and shared across all the smart things in an environment (as a baseline system-level understanding) so as to create an intelligent, contextually aware environment. In such an intelligent environment, connected devices can serve as essentially intelligent systems, sharing a unified contextual understanding to inform decisions. In some implementations, such decisions could be singular, group-based, or collective in nature. In the context of such a platform, a range of seamless, end-to-end solutions can be created that solve larger, more challenging customer problems and drive greater benefits and returns on IoT investments.

FIG. 12 schematically shows an example operating environment in which a system 1200 can track physical items. The system 1200 can be used with one or more other examples described elsewhere herein. The system 1200 can be implemented using one or more examples described herein with reference to FIG. 14.

The system 1200 includes at least one tag 1202 and/or at least one tag 1204A-C. In some implementations, multiple instances (i.e., a plurality) of the tag 1202 can be used, and here only one instance of the tag 1202 is shown for simplicity. The tags 1202 and 1204A-C can be configured to be attached to, mounted on, or otherwise coupled to, respective physical objects which are not shown for simplicity. For example, the tag 1202 may be attached to a sports bag and tags 1204A-C may be attached to a baseball glove, a baseball cap, and a bat, respectively. Communication between the tag 1202 and one or more of the tags 1204A-C may occur by way of sending data packets over respective wireless signals 1206A-C. In some implementations, the wireless signals 1206A-C include beacon signals and the tag 1202 is configured for receiving and recognizing the wireless signals 1206A-C. For example, the tag 1202 can be considered a parent tag with regard to one or more of the tags 1204A-C. As another example, one or more of the tags 1204A-C can be considered a child tag with regard to the tag 1202. In some implementations, at least one instance of the tag 1202 can serve as a child tag to another instance of the tag 1202. In some implementations, at least one instance of the tag 1204A can serve as a child tag to another instance of the tag 1204A. In this example, the tag 1202 can be considered to be at a first level of a hierarchy (e.g., as a parent tag), and the tags 1204A-C can be considered to be at a second level of the hierarchy (e.g., as child tags). In some implementations, more levels than two can be used in a hierarchy. In some implementations, the tag 102 (FIGS. 1A-B), the tag 402 in FIG. 4, the tag 500 in FIG. 5, the tag 900 in FIG. 9, the tag 1000 in FIG. 10, and/or the tag 1102 in FIG. 11 can correspond to the tag 1202 and/or one or more of the tags 1204A-C. For example, the tag 102 in FIGS. 1A-B can represent the tag 1202 (e.g., a parent tag) and the tag 1000 in FIG. 10 can represent one of the tags 1204A-C (e.g., a child tag).

As a practical example, and without limitation, each of the tags 1204A-C can be assigned to an item that a person carries in their purse to serve as a tracker for that item, and the tag 1202 can be defined to correspond to the purse itself, to facilitate organizing and performance of actions based on whether the group of the tags 1204A-C represented by the tag 102 is presently intact, or whether one or more of the tags 1204A-C is deemed not to be within the group.

The system 1200 includes a processing device 1208 that can be implemented using one or more examples described with reference to FIG. 14. In some implementations, the processing device 1208 may be implemented by one or more processors executing instructions stored in one or more instances of computer-readable storage medium. For example, a processor can execute instructions stored in a memory to instantiate and operate the processing device 1208. Communication between the tag 1202 and the processing device 1208 can occur by way of at least one wireless signal 1210. In some implementations, one or more of the tags 1204A-C can communicate directly with the processing device 1208.

The processing device 1208 can be implemented as a single physical component, or can be distributed over multiple physical components. In some implementations, the processing device 1208 may include a mobile electronic device (e.g., a smartphone, tablet, watch, wearable device, and/or laptop). In some implementations, the processing device 1208 may include a dedicated stand-alone device (e.g., a hub in the system 1200).

The processing device 1208 can communicate directly and/or via a network with one or more other components within the system 1200, outside the system 1200, or both. In some implementations, the processing device 1208 may participate in group management (e.g., of the tag 1202 and/or the tags 1204A-C), notification management (e.g., to a user by way of the tag 1202 and/or tags 1204A-C, or another user interface, such as the display device 1438 in FIG. 14), software updates (e.g., of the tag 1202 and/or the tags 1204A-C), power management (e.g., of the tag 1202 and/or the tags 1204A-C), and/or artificial intelligence (e.g., to control the tag 1202 and/or the tags 1204A-C, and/or to control responses to scenarios involving it or them).

The system 1200 can include or make use of one or more remote processing devices, here referred to as clouds 1212. The cloud 1212 can be implemented using one or more examples described with reference to FIG. 14. Communication between the processing device 1208 and the cloud 1212 may occur by way of at least one signal 1214. The signal 1214 can be a wireless signal and/or a wired signal and here schematically illustrates a data network connection between devices. The signal 1214 can be sent through one or more networks, including, but not limited to, a local network and/or the internet. In some implementations, the processing device 1208 or components thereof can be implemented at least in part by the cloud 1212. In some implementations, the tag 1202 and/or at least one of the tags 1204A-C can communicate directly with the cloud 1212.

Activity can be monitored and managed in the system 1200. Activity can include, but is not limited to, one or more aspects of presence, proximity, movement, or concentration, and/or the duration of any such presence, proximity, movement, or concentration. Activity monitoring and management in the system 1200 can occur by way of the processing device 1208 and/or the cloud 1212. Here, an activity management module 1216 is shown as part of the processing device 1208 for purpose of illustration only. The activity management module 1216 can accumulate data 1218 to facilitate and/or in performing such activity management. For example, the data 1218 is stored in a computer-readable medium. For example, data can be stored as state variables on a processing device.

The system 1200 can be configured according to one or more levels. In some implementations, the processing device 1208 and at least the tag 1202 can be considered an item level in the system 1200. For example, the item level can facilitate system awareness of at least the presence, proximity and movement of the physical item(s) associated with the tag(s) 1202. In some implementations, a group level in the system 1200 can include the item level just mentioned and one or more of the tags 1204A-C. For example, the group level can facilitate that the tag 1202 serves as the parent of the tag(s) 1204A-C and monitors the at least the presence, proximity and movement of the physical item(s) associated with the tag(s) 1204A-C. In some implementations, a home level in the system 1200 can include the group level just mentioned and one or more connected components, including, but not limited to a hub in the system 1200, a router, a digital assistant, and/or a smart lightbulb. For example, the home level can provide and manage awareness about the presence, proximity and movement of the physical item(s) associated with the tag(s) 1202 and/or the tag(s) 1204A-C in a broader spatial environment, such as in a home, office or other location. In some implementations, a system intelligence level in the system 1200 can include the home level just mentioned and one or more cloud services. For example, the cloud service(s) can provide contextual notification based on the presence, proximity or movement recognized within the home level. As another example, the cloud service(s) can provide predictive ability based on data recognized in the system 1200 and/or tracked behavior relating to the system 1200 and/or the physical objects associated with the tags 1202 and/or 1204A-C.

Contextualization in the system 1200 can occur by way of the processing device 1208 and/or the cloud 1212. Here, a contextual engine 1220 is shown as part of the processing device 1208 for purpose of illustration only. The contextual engine 1220 can harvest data from one or more sources (e.g., based on detecting the behavior of a nearby device) and use it for contextualization, prediction, and/or to adapt its behavior. Harvested data can include external data, such as calendar information for event data, weather data for weather conditions, or crowd-based data, to name just a few examples. Data can be harvested in one or more ways. In some implementations, each device maintains a state table with various state information about the system. For example, as each device determines a change in the information, the device may update the data in the local state variable and then send the new data to the other devices in the system so that each device maintains a current view of the system.

In some implementations, contextualization can include collection of standardized data from one or more entities in the system 1200 (e.g., ultimately from the tag 1202 and/or the tags 1204A-C), collection of disparate device data (e.g., data that is unexpected or otherwise does not conform to a data standard), and/or performance of system dictated actions (e.g., issuing a notification, modifying a behavior, redistributing one or more system resources). Contextualization can be related to or facilitated by the invocation of one or more rules 1222 in the system 1200. Solely as illustrative examples, the rule(s) 1222 can define, with regard to the tag 1202 and/or the tag(s) 1204A-C, one or more locations where presence is permitted, required, or is not permitted; one or more objects or persons with which a certain proximity is permitted, required, or is not permitted; one or more characteristics of movement that is permitted, required, or is not permitted; and/or one or more concentrations that is permitted, required, or is not permitted. The rule(s) 1222 can specify actions performable by the system 1200 under specific circumstances (e.g., to generate a notification or to energize or de-energize a component). For example, the rules 1222 are stored in a computer-readable medium.

Contextualization can be based on one or more aspects of environmental understanding. In some implementations, an environmental understanding can include information or input that can be processed (e.g., weather conditions, time-based information, information extracted from a calendar, location, presence and/or activity). For example, notification that one of the tags 1204A-C is not currently present in the group represented by the tag 1202 can be conditioned on some aspect of the weather information (e.g., whether precipitation is forecast).

Some examples herein describe that a tag (e.g., a parent tag or child tag) independently is in charge of deciding when to beacon, such as randomly or at regular intervals, as a way to allow a system to detect and organize that tag. In other implementations, a tag beacons in response to detecting that another device (e.g., a tag, processing device, and/or IoT device) is nearby according to a proximity metric. This can allow the tag to improve its power management, in that transmissions are not made unless they are likely to be detected. The tag can be configured to allow one or more specific devices (e.g., a specific tag, processing device, or IoT device), or types of device (e.g., any tag, processing device, or IoT device), to wake up the tag. When the processor of the tag is suspended (e.g., in a sleep mode or other low-power mode), the wireless interface of the tag (e.g., a radio) can remain powered so as to detect a wireless wake-up signal. The tag can have a programming that causes it to beacon (e.g., randomly or regularly) when it is awake.

Figure 13:
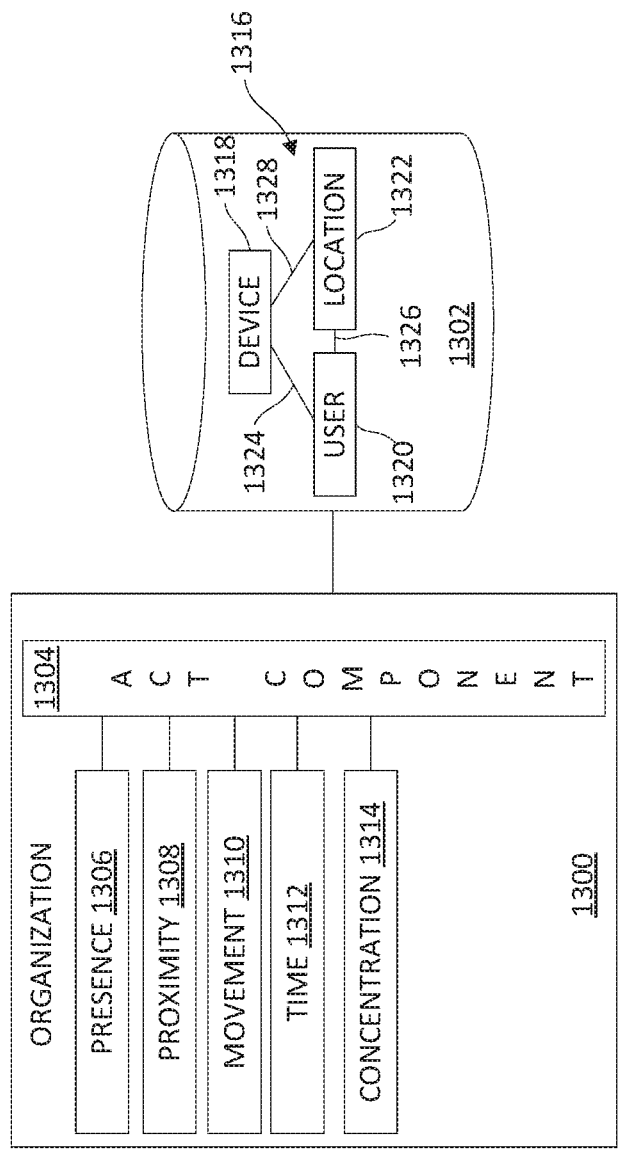
FIG. 13 shows an example of an organization module and a rules repository.

FIG. 13 shows an example of an organization module 1300 and a rules repository 1302. The organization module 1300 and the rules repository 1302 can be used with one or more other examples described elsewhere herein. The organization module 1300 and the rules repository 1302 can be implemented using one or more examples described with reference to FIG. 14. For example, the organization module 1300 can be implemented by way of at least one processor executing instructions stored in a computer-readable medium. The rules in the rules repository 1302 can relate to relationships including, but not limited to, permissions, groupings, and/or parent-child hierarchies.

The organization module 1300 can be implemented in a device such as the tag 200 (FIG. 2), the tags 1202 and/or 1204A-C (FIG. 12), or in the processing device 1208 (FIG. 12), to name just a few examples. Such device(s) can receive wireless signals from one or more items being monitored. For example, the tag 1202 when serving as a parent tag can receive the wireless signals 1206A-C from the tags 1204A-C, respectively, serving as child tags. As another example, the processing device 1208 can receive the wireless signal 1210 from the tag 1202.

The organization module 1300 can use the received signal(s) to gain insight into at least the presence, proximity, or movement of the transmitting device, or of a device related to the transmitting device. In some implementations, received signal strength indication (RSSI) can be used as part of such a determination. The RSSI can indicate the power present in the received signal. In some implementations, relative RSSI can be used. Generally speaking, when the transmitting device is closer to the receiving device, the RSSI tends to be greater because there is more power in the received signal. In some implementations, a first tag can determine, in its wireless module, an RSSI for a signal that the first tag receives from a second tag. The first tag can receive from the second tag a "received RSSI" value reflecting an RSSI determined by the second tag. The first and second tags can store the determined RSSI and the received RSSI value in state variables.

The organization module 1300 can detect "activity" of a tag, processing device, and/or a third-party IoT device, in any of several senses, including, but not limited to, that the device is present in a system, that the device is proximate to something (e.g., another device, a tag, an object, or a user), and/or that the device is moving, and the organization module 1300 can take action if appropriate. The organization module 1300 can also or instead detect the "inactivity" of a device and take action if appropriate. As such, the organization module 1300 may not merely detect, or respond to, a device's action.

In some implementations, activity can be detected or determined in one or more ways. For example, a tag can send a message when the tag senses (e.g., by an accelerometer) that it is moving. As another example, a first tag can detect that a second tag is moving because the RSSI is decreasing in a predictable manner. As another example, a first tag can detect that a second tag is moving because the RSSI is decreasing and a third tag reports increasing RSSI with the second tag.

In some implementations, time (e.g., duration) can be part of such a determination of activity. In some implementations, a transmitting device may include a timestamp or other time identifier in the transmitted message, and the receiving device can compare the timestamp/identifier with its (internal) clock to determine an amount of time that passed between the sending and the receipt of the wireless signal. For example, the clocks in the transmitting and receiving devices can be synchronized to a master clock, or the receiving device may know how to translate the transmitting device's timestamp into its local time. Internal processing delays (at the transmitting or receiving end) can be accounted for. As another example, the time can be measured from the moment of sending a request for a response until the response is received. The time is a measure of the latency experienced in communication between two devices (e.g., two tags, a parent tag and a child tag, and/or a tag and a processing device). A latency value can be defined based on the time it takes for a signal to reach the receiver. The latency value, moreover, can be used to characterize the distance between the transmitting and receiving devices, which gives an indication as to the relative position of the devices. In some implementations, time may be measured with round trip time (RTT) for estimating distance. For example: the sender sends a message, and based on the time it takes to receive a response, the sender can infer things about link quality and distance. RTT can be used to give information about packet loss, error rate, or number of hops (in the case of a mesh search).

In some implementations, connectivity can be part of such a determination. In some implementations, connectivity can represent whether a device (e.g., a parent tag) is able to communicate with another device (e.g., a child tag). For example, a connectivity parameter can be a binary factor dependent on whether communication is currently established between two devices.

The organization module 1300 can use one or more of, or a combination of, at least RSSI and connectivity to measure at least presence, proximity and movement of any tag. In some implementations, the RSSI can be represented by a value RSSI and the connectivity parameter can be denoted by C. The organization module 1300 can then operate based on a metric $$A(RSSI, C),$$

where A indicates an activity of at least one tag and reflects a measure of the distance, proximity, or movement between, say, a child tag and a parent tag. A can be expressed as depending on the RSSI, latency value, and connectivity as follows:

$$A = a_f f(RSSI) + a_g g(C),$$

where $f$ is a function depending on at least the RSSI, g is function depending on at least the connectivity value C, and $a_f$ and $a_g$ are coefficients or other modifying factors (e.g., dynamically scalable factors) for the functions $f$ and g, respectively.

The activity A can also or instead take into account one or more other characteristics. For example, latency can be taken into account (e.g., denoted by L). For example, packet error rate can be taken into account (e.g., denoted by PER). For example, packet loss can be taken into account (e.g., denoted by PL). For example, change in RSSI over time can be taken into account (e.g., denoted by ΔRSSI). For example, change in connectivity over time can be taken into account (e.g., denoted by ΔC). For example, change in latency over time can be taken into account (e.g., denoted by ΔL). For example, change in packet error rate over time can be taken into account (e.g., denoted by ΔPER). For example, change in packet loss over time can be taken into account (e.g., denoted by ΔPL). In some implementations, the activity A can be based on one or more of RSSI, C, L, PER, PL, ΔRSSI, ΔC, ΔL, ΔPER, or ΔPL.

As such, a metric for the distance between devices (e.g., two tags, a parent tag and a child tag, and/or a tag and a processing device) can be defined based on at least one of the RSSI, the latency value, the connectivity parameter, and/or changes in one or more of such characteristics, for example as shown for A above. This can be considered an activity measure that the organization module 1300 can use in determining the presence, proximity, and movement of one or more tags. The activity measure takes into account at least one of RSSI, C, L, PER, PL, ΔRSSI, ΔC, ΔL, ΔPER, or ΔPL, and can optionally take into account also one or more other parameters. The organization module 1300 can include an activity component 1304 that can be responsible for determining and providing an activity measure (e.g., based on A above). In some implementations, the activity component 205 (FIG. 2) can include one or more aspects of functionality described with reference to the activity component 1304.

The organization module 1300 can include one or more components that facilitate use of an activity measure in determining, and reacting to, the activity of one or more tags. In some implementations, the organization module 1300 includes a presence component 1306 coupled to the activity component 1304. For example, the presence component 1306 can make use of the activity measure of the activity component 1304 to determine the presence of a tag (e.g., whether the tag 1204A (FIG. 12) serving as a child tag is present relative to the tag 1202 serving as a parent tag for the tag 1204A). As another example, a tag can be deemed present if it is detected by the system, whether the tag is proximate to another tag (e.g., its parent tag) or not. The determination of whether a tag is present can depend on the rules in the rules repository 1302, and as such can be different for different physical objects. For example, a wallet labeled with a tag can be deemed present if it is detected as being inside the dwelling of the person who owns the wallet; a wheelbarrow, on the other hand, can be deemed to be present if it is detected by either the system monitoring the owner's house or the corresponding system at the neighbor's house, in that the neighbor may be permitted to borrow the wheelbarrow from the owner's yard.

In some implementations, the organization module 1300 includes a proximity component 1308 coupled to the activity component 1304. For example, the proximity component 1308 can make use of the activity measure of the activity component 1304 to determine the proximity of a tag (e.g., how proximate the tag 1204A (FIG. 12) serving as a child tag is relative to the tag 1202 serving as a parent tag for the tag 1204A).

In some implementations, the organization module 1300 includes a movement component 1310 coupled to the activity component 1304. For example, the movement component 1310 can make use of the activity measure of the activity component 1304 to determine the movement of a tag (e.g., how the tag 1204A (FIG. 12) serving as a child tag moves relative to the tag 1202 serving as a parent tag for the tag 1204A).

In some implementations, the organization module 1300 includes a time component 1312 coupled to the activity component 1304. For example, the time component 1312 can make use of the activity measure of the activity component 1304 to determine a duration relating to a tag (e.g., how long the tag 1204A (FIG. 12) serving as a child tag is present, proximate, and/or moving relative to the tag 1202 serving as a parent tag for the tag 1204A). As another example, a time as in the time of day at a particular location, can be a factor in applying a rule based on contextualized information.

In some implementations, the organization module 1300 includes a concentration component 1314 coupled to the activity component 1304. For example, the concentration component 1314 can make use of the activity of the activity component 1304 to determine a concentration of at least one tag (e.g., some or all of the tags 1204A-C (FIG. 12) serving as child tags relative to the tag 1202 serving as a parent tag for the tags 1204A-C). For example, a concentration can be used to provide multi-factor authentication of a user. As another example, a concentration can be used to generate a heat map of a location (e.g., to aid a determination of what type of environment it is).

The activity component 1304 can factor in a temporal component in the determination of an activity measure. In some implementations, one of the rules in the rules repository 1302 can define that an alert should be generated if one of the tags 1204A-C (FIG. 12) is not present in the group represented by the tag 1202. However, if for example, the tag 1204A had been detected as present within the group over an extended period of time and was not detected as undergoing (significant) movement at the time its signal was lost, the activity component 1304 can apply a grace period (e.g., on the order of a few or multiple seconds) before generating the alert. For example, this temporal component (e.g., a grace period) can account for the situation where the signal 1206A (FIG. 12) from the tag 1204A was temporarily blocked and the absence of the signal 1206A did not correspond to the tag 1204A being missing from the group represented by the tag 1202. Also, or instead, another component in the organization module 1300 can apply the temporal component to a corresponding determination.

The organization module 1300 can take into account contextualized information in determining the activity (e.g., presence, proximity, and/or movement) of any tag, in performing one or more actions in response thereto, or in deciding not to take action. In some implementations, the contextual engine 1220 (FIG. 12) or a similar component can serve to contextualize harvested information so that the rules in the rules repository 1302 can be applied appropriately.

The tags (e.g., the tag 1202 and/or the tags 1204A-C in FIG. 12) can be proxies for other devices, users, and/or locations. The rules in the rules repository 1302 can reflect such an organization. In some implementations, a rule 1316 can reflect one or more of a device 1318, a user 1320, or a location 1322. Moreover, the rule 1316 can involve a device-user relationship 1324, a user-location relationship 1326, and/or a device-location relationship 1328. As such, any of a number of relationships can be taken into account when applying the rule(s) in the rules repository 1302, and can be reflected in the particular action (or a non-action) taken in response.

As such, the contextual engine 1220 in FIG. 12 is an example of a contextual engine implemented using a processor (e.g., the processing device 1402 in FIG. 14) executing instructions stored in a memory (e.g., the memory 1404 in FIG. 14), the contextual engine configured to identify an action relating to at least one tag of a plurality of tags (e.g., two or more of the tags 1202 and/or 1204A-C) based on an activity measure (e.g., determined by the activity component 1304) for the corresponding tag.

The rules 1222 in FIG. 12 can be stored in a rules repository accessible to a contextual engine (e.g., to the at least one processor of the contextual engine 1220 in FIG. 12), the rules repository having stored therein rules (e.g., the rule 1316) regarding respective actions performable by the activity component (e.g., by the at least one processor of the organization module 1300), the rules depending on the activity measure (e.g., determined by the activity component 1304) for the at least one of the first plurality of tags, the action identified using the rules.

A user interface can be provided on one or more devices. In some implementations, a graphical user interface can be provided on a processing device (e.g., the processing device in FIG. 1), and/or a tag can provide for input and/or output (e.g., by way of the user interface 214 in FIG. 2). The user interface can be based on, and reflect, one or more status of a tag (e.g., the tags 1202 and/or 1204A-C in FIG. 12). In some implementations, a tag can have a status of connected, out of range, or marked as lost. For example, in the connected state, the user interface can provide a control for the user to initiate a locate function for the item.

In the out of range state, the user interface can provide a control for identifying the location where the system most recently detected the tag. As another example, the user interface can provide a control for marking the tag as lost.

In the marked as lost state, the user interface can provide a control for identifying the location where the system most recently detected the tag. As another example, the user interface can provide a control for launching a crowd-location function for the tag. As another example, the user interface can provide a control for marking the tag as found.

The user interface can provide one or more other functionalities relating to a tag (e.g., a parent tag or a child tag). Such functionality can include, but is not limited to, adding a tag; defining or editing a group of tags; defining or editing a rule relating to one or more tags; viewing and/or editing details of a tag or a group of tags; re-calibrating a tag with regard to a processing device or to at least one other tag; replacing a tag; deleting a tag; alerting that a tag battery needs recharging; alerting that a non-rechargeable battery is running out of power; performing an update (e.g., of software or firmware); prioritizing among tags; and combinations thereof.

Figure 14:
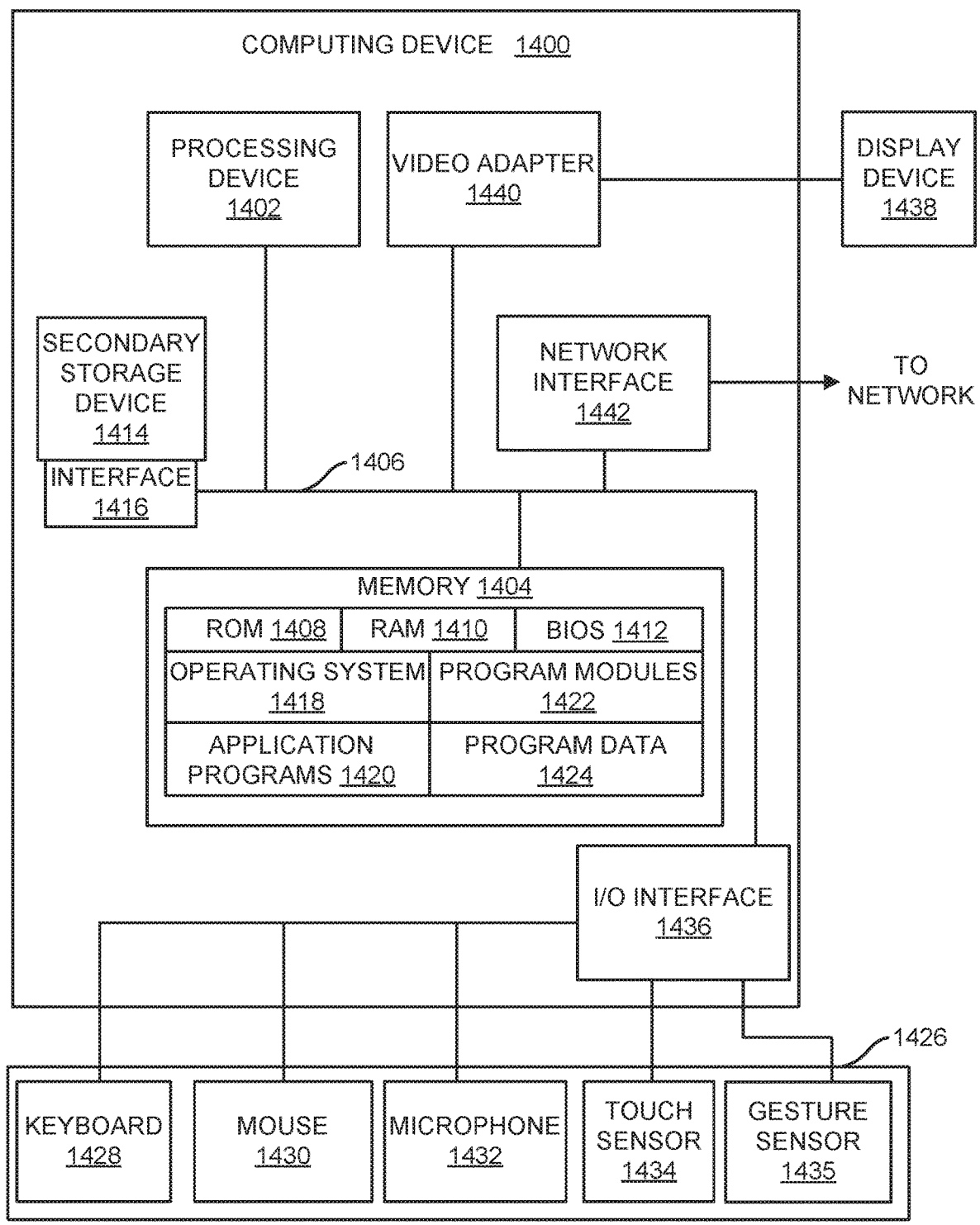
FIG. 14 shows an example of a computer device that can be used to implement the techniques described here.

FIG. 14 illustrates an example architecture of a computing device 1400 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 14 can be used to execute the operating system, application programs, and/or software modules (including the software engines) described herein.

The computing device 1400 includes, in some embodiments, at least one processing device 1402 (e.g., a processor), such as a central processing unit (CPU). A variety of processing devices are available from a variety of manufacturers, for example, Intel or Advanced Micro Devices. In this example, the computing device 1400 also includes a system memory 1404, and a system bus 1406 that couples various system components including the system memory 1404 to the processing device 1402. The system bus 1406 is one of any number of types of bus structures that can be used, including, but not limited to, a memory bus, or memory controller; a peripheral bus; and a local bus using any of a variety of bus architectures.

Examples of computing devices that can be implemented using the computing device 1400 include a desktop computer, a laptop computer, a tablet computer, a mobile computing device (such as a smart phone, a touchpad mobile digital device, or other mobile devices), or other devices configured to process digital instructions.

The system memory 1404 includes read only memory 1408 and random access memory 1410. A basic input/output system 1412 containing the basic routines that act to transfer information within computing device 1400, such as during start up, can be stored in the read only memory 1408.

The computing device 1400 also includes a secondary storage device 1414 in some embodiments, such as a hard disk drive, for storing digital data. The secondary storage device 1414 is connected to the system bus 1406 by a secondary storage interface 1416. The secondary storage device 1414 and its associated computer readable media provide nonvolatile and non-transitory storage of computer readable instructions (including application programs and program modules), data structures, and other data for the computing device 1400.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 1414 and/or system memory 1404, including an operating system 1418, one or more application programs 1420, other program modules 1422 (such as the software engines described herein), and program data 1424. The computing device 1400 can utilize any suitable operating system, such as Microsoft Windows™, Google Chrome™ OS, Apple OS, Unix, or Linux and variants and any other operating system suitable for a computing device. Other examples can include Microsoft, Google, or Apple operating systems, or any other suitable operating system used in tablet computing devices.

In some embodiments, a user provides inputs to the computing device 1400 through one or more input devices 1426. Examples of input devices 1426 include a keyboard 1428, mouse 1430, microphone 1432 (e.g., for voice and/or other audio input), touch sensor 1434 (such as a touchpad or touch sensitive display), and gesture sensor 1435 (e.g., for gestural input. In some implementations, the input device(s) 1426 provide detection based on presence, proximity, and/or motion. In some implementations, a user may walk into their home, and this may trigger an input into a processing device. For example, the input device(s) 1426 may then facilitate an automated experience for the user. Other embodiments include other input devices 1426. The input devices can be connected to the processing device 1402 through an input/output interface 1436 that is coupled to the system bus 1406. These input devices 1426 can be connected by any number of input/output interfaces, such as a parallel port, serial port, game port, or a universal serial bus. Wireless communication between input devices 1426 and the input/output interface 1436 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 1438, such as a monitor, liquid crystal display device, projector, or touch sensitive display device, is also connected to the system bus 1406 via an interface, such as a video adapter 1440. In addition to the display device 1438, the computing device 1400 can include various other peripheral devices (not shown), such as speakers or a printer.

The computing device 1400 can be connected to one or more networks through a network interface 1442. The network interface 1442 can provide for wired and/or wireless communication. In some implementations, the network interface 1442 can include one or more antennas for transmitting and/or receiving wireless signals. When used in a local area networking environment or a wide area networking environment (such as the Internet), the network interface 1442 can include an Ethernet interface. Other possible embodiments use other communication devices. For example, some embodiments of the computing device 1400 include a modem for communicating across the network.

The computing device 1400 can include at least some form of computer readable media. Computer readable media includes any available media that can be accessed by the computing device 1400. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 1400.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 14 is also an example of programmable electronics, which may include one or more such computing devices, and when multiple computing devices are included, such computing devices can be coupled together with a suitable data communication network so as to collectively perform the various functions, methods, or operations disclosed herein.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A tag comprising:
a housing configured for coupling the tag to a physical object to organize activities regarding the physical object; and
coupled to the housing:
a wireless communication component;
circuitry electrically coupled to the wireless communication component, the circuitry having a reset port and a switch port;
a power source electrically coupled to the wireless communication component and the circuitry;
a first switch between the power source and the reset port, the first switch coupled directly to the reset port;
a second switch between the reset port and ground, the second switch controlled by the switch port; and
a capacitor between the reset port and the ground, wherein the circuitry is configured to repeatedly generate a discharge signal at the switch port to discharge the capacitor and prevent voltage at the reset port from resetting the circuitry.

2. The tag of claim 1, further comprising a button on an outside of the housing, the button coupled to the first switch.

3. The tag of claim 1, further comprising a sensor coupled to the circuitry, the circuitry configured to adapt a behavior of the tag based on an output of the sensor.

4. The tag of claim 3, wherein the output of the sensor indicates at least one of: moisture, humidity, temperature, pressure, altitude, acoustics, wind speed, strain, shear, magnetic field strength and/or orientation, electric field strength and/or orientation, electromagnetic radiation, particle radiation, compass point direction, or acceleration.

5. The tag of claim 1, wherein the circuitry is configured to repeatedly generate the discharge signal at the switch port to discharge the capacitor and prevent the voltage at the reset port from resetting the circuitry, until the circuitry receives a discharge inhibition signal using the wireless communication component.

6. The tag of claim 1, wherein the power source includes a rechargeable power source.

7. The tag of claim 6, further comprising at least a charge pin electrically coupled to the rechargeable power source and terminating at an outside of the housing, and a data interface including first and second data pins electrically coupled to the circuitry and terminating at the outside of the housing.

8. The tag of claim 7, wherein the first data pin is configured for carrying to the circuitry a voltage applied to the charge pin, and wherein the second data pin is configured for communicating a charging status to the circuitry.

9. A tag comprising:
a housing configured for coupling the tag to a physical object to organize activities regarding the physical object; and
coupled to the housing:
a wireless communication component;
circuitry electrically coupled to the wireless communication component;
a rechargeable power source electrically coupled to the wireless communication component and the circuitry;
at least a first charge pin electrically coupled to the rechargeable power source for charging the rechargeable power source, the first charge pin and terminating at an outside of the housing; and
a data interface including first and second data pins electrically coupled to the circuitry and terminating at the outside of the housing.

10. The tag of claim 9, further comprising a second charge pin terminating at the outside of the housing.

11. The tag of claim 9, wherein the first data pin is configured for carrying to the circuitry a voltage applied to the charge pin.

12. The tag of claim 9, wherein the second data pin is configured for communicating a charging status to the circuitry.

13. The tag of claim 9, wherein the circuitry includes a reset port and a switch port, the tag further comprising a first switch between the power source and the reset port, a second switch between the reset port and ground, the second switch controlled by the switch port, and a capacitor between the reset port and the ground.

14. A system comprising:
a tag configured for being coupled to a physical object to organize activities regarding the physical object, the tag comprising:
a first housing; and
coupled to the first housing, a wireless communication component, a first memory, and a first processor coupled to the wireless communication component and configured for adapting a behavior of the tag; and
an accessory to be attached to the physical object, the accessory comprising a second housing having a receptacle, the receptacle configured for being coupled to the first housing of the tag so that the accessory releasably holds the tag, the accessory comprising a second memory and a second processor configured for interacting with the first processor of the tag.

15. The system of claim 14, wherein the tag further includes a power source, a reset port and a switch port coupled to the first processor, a first switch between the power source and the reset port, a second switch between the reset port and ground, the second switch controlled by the switch port, and a capacitor between the reset port and the ground.

16. The system of claim 14, wherein the accessory further includes a sensor coupled to the second processor, the second processor configured to adapt a behavior of the tag based on an output of the sensor.

17. The system of claim 16, wherein the output of the sensor indicates at least one of: moisture, humidity, temperature, pressure, altitude, acoustics, wind speed, strain, shear, magnetic field strength and/or orientation, electric field strength and/or orientation, electromagnetic radiation, particle radiation, compass point direction, or acceleration.

18. The system of claim 14, wherein the tag further comprises a rechargeable power source, a charge pin electrically coupled to the rechargeable power source and terminating at an outside of the first housing, and a data interface including first and second data pins electrically coupled to the first processor circuitry and terminating at the outside of the first housing.

19. The system of claim 14, wherein the accessory further comprises a first power source.

20. The system of claim 19, wherein the first power source includes a solar panel mounted to the second housing.

* * * * *

UNITED STATES PATENT AND TRADEMARK OFFICE
CERTIFICATE OF CORRECTION

PATENT NO. : 10,783,420 B2
APPLICATION NO. : 16/183097
DATED : September 22, 2020
INVENTOR(S) : Friedenberg et al.

It is certified that error appears in the above-identified patent and that said Letters Patent is hereby corrected as shown below:

In the Claims

In Column 28, Claim 9, Line 3, delete "pin and" and insert -- pin --, therefor.

In Column 28, Claim 18, Line 66, delete "processor circuitry" and insert -- processor --, therefor.

Signed and Sealed this
Eighth Day of December, 2020

Andrei Iancu
*Director of the United States Patent and Trademark Office*